US011968546B2

(12) United States Patent
Chisci et al.

(10) Patent No.: US 11,968,546 B2
(45) Date of Patent: Apr. 23, 2024

(54) BEAM COVERAGE ASSESSMENT FOR CHANNEL ACCESS

(71) Applicant: QUALCOMM INCORPORATED, San Diego, CA (US)

(72) Inventors: Giovanni Chisci, San Diego, CA (US); Jing Sun, San Diego, CA (US); Arumugam Chendamarai Kannan, San Diego, CA (US); Vinay Chande, San Diego, CA (US); Sumant Jayaraman Iyer, San Diego, CA (US); Marco Papaleo, Bologna (IT); Tao Luo, San Diego, CA (US); Aleksandar Damnjanovic, Del Mar, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/691,536

(22) Filed: Mar. 10, 2022

(65) Prior Publication Data

US 2022/0369125 A1     Nov. 17, 2022

Related U.S. Application Data

(60) Provisional application No. 63/187,257, filed on May 11, 2021.

(51) Int. Cl.
*H04W 16/28* (2009.01)
(52) U.S. Cl.
CPC .................................. *H04W 16/28* (2013.01)

(58) Field of Classification Search
CPC ............................. H04W 16/28; H04B 7/0695
See application file for complete search history.

(56) References Cited

U.S. PATENT DOCUMENTS

2020/0336921 A1    10/2020   Yerramalli et al.
2020/0413268 A1*   12/2020   Yerramalli .......... H04W 72/046
2020/0413449 A1*   12/2020   Yerramalli ........... H04B 7/0617
(Continued)

OTHER PUBLICATIONS

Partial International Search Report and Written Opinion—PCT/US2022/020275—ISA/EPO—dated Jun. 22, 2022.
(Continued)

*Primary Examiner* — Kenneth T Lam
(74) *Attorney, Agent, or Firm* — QUALCOMM Incorporated

(57) ABSTRACT

A method for wireless communication includes a first wireless communication device receiving, from a second wireless communication device, one or more signals for each of a plurality of candidate sensing beams and a transmission beam. The method also includes determining, for each of the plurality of candidate sensing beams based on at least one of the one or more signals for the respective candidate sensing beam, a first signal measurement. The method also includes determining, based on at least one of the one or more signals for the transmission beam, a second signal measurement with respect to a direction of the transmission beam, and determining, for each of the plurality of candidate sensing beams based on the respective first signal measurement and the second signal measurement, beam coverage information with respect to the transmission beam direction.

14 Claims, 14 Drawing Sheets

(56) References Cited

U.S. PATENT DOCUMENTS

| | | | | |
|---|---|---|---|---|
| 2021/0058967 | A1* | 2/2021 | Oteri | H04W 16/14 |
| 2021/0136823 | A1* | 5/2021 | Kim | H04W 74/0891 |
| 2022/0408420 | A1* | 12/2022 | Li | H04W 72/044 |
| 2023/0051723 | A1* | 2/2023 | Myung | H04B 7/0695 |
| 2023/0066772 | A1* | 3/2023 | Myung | H04W 74/0808 |
| 2023/0101279 | A1* | 3/2023 | Niu | H04L 5/0094 |
| | | | | 370/329 |
| 2023/0141702 | A1* | 5/2023 | Ganesan | H04L 5/0053 |
| | | | | 370/329 |

OTHER PUBLICATIONS

International Search Report and Written Opinion—PCT/US2022/020275—ISA/EPO—dated Aug. 26, 2022.

* cited by examiner

BEAM COVERAGE ASSESSMENT FOR CHANNEL ACCESS

CROSS-REFERENCE TO RELATED APPLICATIONS

This application claims priority to and the benefit of U.S. Provisional Patent Application No. 63/187,257, filed May 11, 2021, the entirety of which is hereby incorporated by reference.

TECHNICAL FIELD

This application relates to wireless communication systems, and more particularly to beam coverage assessment for channel access for communications in a wireless communication network operating over an unlicensed spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel For example, a transmitting node may listen to the channel to determine whether there are active transmissions in the channel. When the channel is idle, the transmitting node may transmit a preamble to reserve a transmission opportunity (TXOP) in the shared channel and may communicate with a receiving node during the TXOP. As use cases and diverse deployment scenarios continue to expand in wireless communication, channel access technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect of the present disclosure includes a method for wireless communication performed by a first wireless communication device. The method includes receiving, from a second wireless communication device, one or more signals for each of a plurality of candidate sensing beams and a transmission beam. The method also includes determining, for each of the plurality of candidate sensing beams based on at least one of the one or more signals for the respective candidate sensing beam, a first signal measurement with respect to at least one of a direction of the transmission beam or a direction of the respective candidate sensing beam direction. The method also includes determining, based on at least one of the one or more signals for the transmission beam, a second signal measurement with respect to the direction of the transmission beam. The method also includes determining, for each of the plurality of candidate sensing beams based on the respective first signal measurement and the second signal measurement, beam coverage information with respect to the transmission beam direction.

Another aspect of the present disclosure includes a method of wireless communication performed by a wireless communication device. The method includes selecting, based on beam coverage information associated with a plurality of candidate sensing beams and one or more first transmission beams, a sensing beam from the plurality of candidate sensing beams. The method also includes sensing, based on the selected sensing beam, a channel in a shared frequency band. The method also includes determining, based on the sensing, whether to transmit a communication signal in the one or more first transmission beams.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
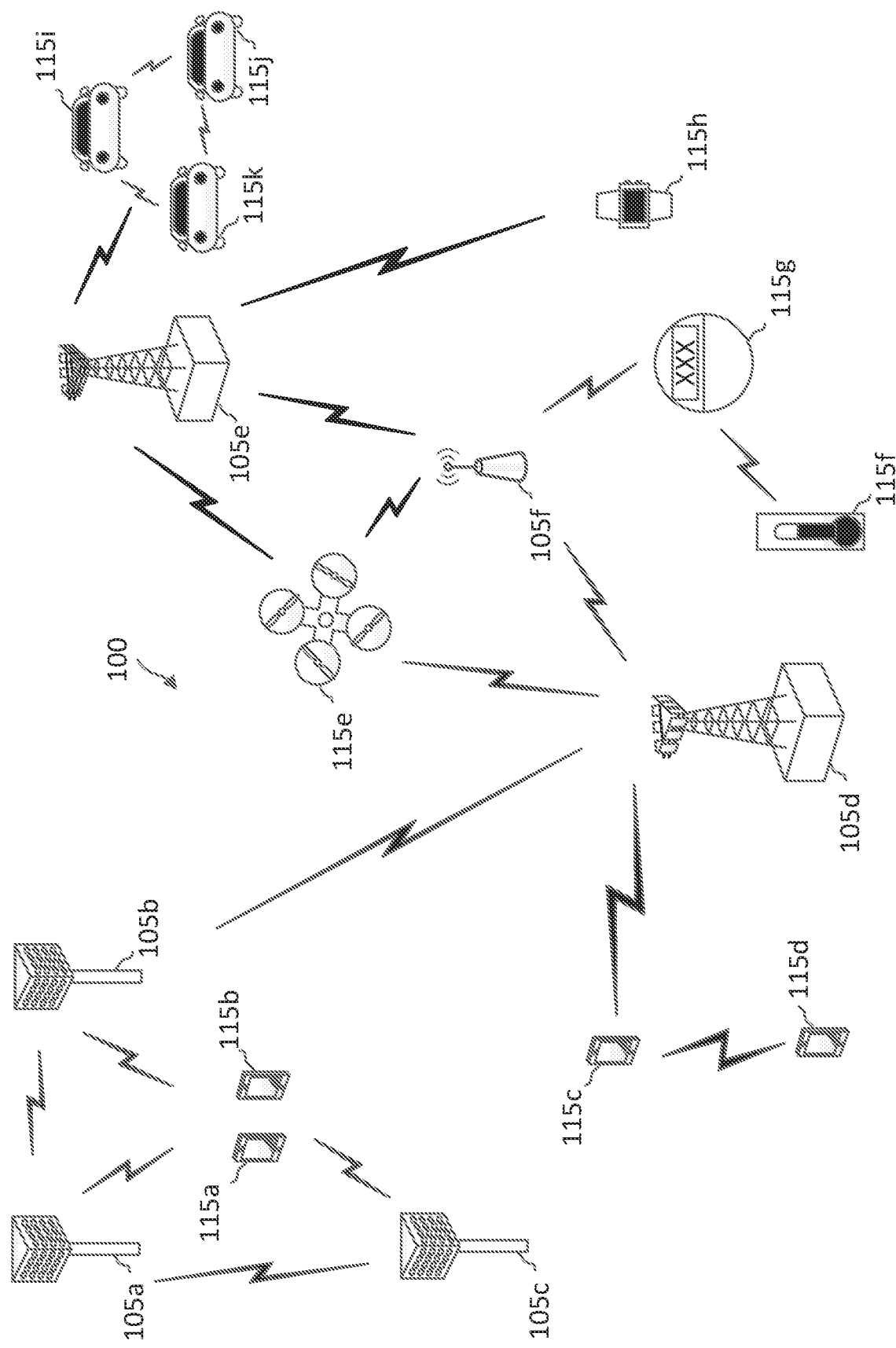
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

To enable coexistence among multiple devices in a shared or unlicensed spectrum, a listen-before-talk (LBT) procedure may be used to assess whether a shared channel is clear before transmitting a signal in the channel. During the LBT procedure, a device may perform a clear channel assessment (CCA) for a predetermined duration to contend for a channel occupancy time (COT). During the CCA, the device may compare the energy level detected in the channel to a threshold value. If the energy level exceeds the threshold, the device may determine that the channel is occupied, refrain from transmitting a signal in the channel, and repeat the CCA after a period of time, or the device may reduce its transmit power to avoid interfering with other devices that may be using the channel. If the energy level is below the threshold, the device may determine that the channel is unoccupied (indicating the device won the contention) and proceed with transmitting a signal in the COT.

The unlicensed spectrum that are available for wireless communications may include 5 gigahertz (GHz) bands, 6 GHz bands, and 60 GHz bands. One of the key driver for LBT in the 60 GHz bands is European Telecommunications Standards Institute (ETSI). To that end, in a first ETSI operating mode, a mobile or fixed wireless communication device or node is mandated to perform an LBT prior to accessing an unlicensed band in the 60 GHz range. A device or node communicating over a 60 GHz band is likely to use beamformed signals to compensate the high signal attenuation at the high frequency. A beamformed signal may focus its signal energy in a specific beam direction towards an intended receiver, and thus multiple transmitters can transmit at the same time in different spatial directions without interfering with each other or with a minimal interference.

As used herein, the term "transmission beam" may refer to a transmitter transmitting a beamformed signal in a certain spatial direction or beam direction and/or with a certain beam width covering a certain spatial angular sector. The transmission beam may have characteristics such as the beam direction and the beam width. The term "reception beam" may refer to a receiver using beamforming to receive a signal from a certain spatial direction or beam direction and/or within a certain beam width covering a certain spatial angular sector. The reception beam may have characteristics such as the beam direction and the beam width. Further, a transmission beam or a reception beam may have a certain radiated power pattern in the corresponding beam direction. The radiated power pattern is a combination of a beam gain pattern and a conducted power. The conducted power is the power at the radio frequency (RF) frontend output (e.g., at the connector to the antenna array) of transmitter or receiver. The beam gain pattern may be dependent on the antenna array gain.

When operating in a shared frequency band using beamforming, it may be desirable to determine whether a shared frequency band is available in one or more desired transmit beam directions. For example, a wireless communication device may select or determine one or more transmit beam directions for transmitting one or more communication signals or reference signals. Accordingly, the wireless communication device may desire to know whether the shared frequency band is available in each of the transmission beam directions. However, performing an LBT for each of a plurality of different transmission beam directions can be an inefficient use of network resources.

Accordingly, the present disclosure describes systems and mechanisms for performing channel sensing (e.g., LBT) using a sensing beam that is mismatched from one or more desired transmission beams. The mismatch may refer to the difference in beam characteristics (e.g., beam direction, radiated power patter, and/or beam gain pattern) between a sensing beam and a transmission beam. Because the sensing beam may not be the same as the transmission beam used for transmission, signal measurements obtained in the sensing beam direction from the channel sensing may not provide the same sensitivity (e.g., receive sensitivity) as the transmission beam. That is, the sensing beam can be less sensitive or more sensitive than the transmission beam in the transmission beam direction. In the case where the sensing beam is less sensitive than the transmission beam, the channel sensing may be overly aggressive (in gaining channel access), whereas in the case where the sensing beam is more sensitive than the transmission beam, the channel sensing may be overly conservative (in gaining channel access). Accordingly, the present disclosure provides techniques for determining whether a sensing beam is suitable for channel sensing in a transmission beam direction of a desired transmission when the sensing beam direction is different than the transmission beam direction. Further, the present disclosure provides techniques for adjusting energy detection thresholds for channel sensing using the sensing beam to better match the sensitivity of the transmission beam in the transmission beam direction.

For example, aspects of the present disclosure include sensing a channel using a single sensing beam direction to obtain signal measurements associated with each of a plurality of transmission beam directions. Further, the present disclosure describes systems and mechanisms for assessing or validating a candidate sensing beam direction for channel sensing in a multi-transmission beam communication scenario. In some aspects, a first wireless communication device may be configured to obtain signal measurements of a second wireless communication device for each of a plurality of candidate sensing beam directions of the second wireless communication device with respect to each of a plurality of transmission beam directions of the second wireless communication device, and determine a spatial beam coverage of each sensing beam direction with respect to each of the plurality of transmission beam directions. The spatial beam coverage may correspond to the radiated power pattern and/or the beam gain pattern of the sensing beam. The second wireless communication device where the beam signals are being measured can be a BS or a UE. Some aspects, the first wireless communication device may be a manufacturing/calibration device or test equipment used in the manufacturing and/or calibration phase of the second wireless communication device. The first wireless communication device may save and/or record the beam coverage information, for example, in one or more lists or lookup tables. The beam coverage information may be stored at the second wireless communication, and the second wireless communication device may utilize the beam coverage information for channel sensing during operations. In some aspects, the first wireless communication device may transmit the beam coverage information to the second wireless communication device, and the second wireless communication device may store the beam coverage information (e.g., at a memory of the second wireless communication device) for later use. In other aspects, the beam coverage information may be transferred to another device that can configure the beam coverage information at a memory of the second wireless communication device To determine the beam coverage information, the manufacturing/calibration device may determine whether a sensing beam direction of the second wireless communication device is eligible for one or more transmission beam directions of the second wireless communication device by comparing a beam coverage parameter, such as a signal power difference or a beam pattern gain difference, to a corresponding threshold. For example, the manufacturing/calibration device may be configured to determine a difference in signal power between the sensing beam with respect to the transmission beam direction and a maximum signal power of the desired transmission beam in the transmission beam direction. If the candidate sensing beam meets the threshold criteria, the manufacturing/calibration device may indicate, in the beam coverage information, that the candidate sensing beam is eligible for channel sensing for the desired transmission beam. In some aspects, the manufacturing/calibration device may also determine an energy detection threshold adjustment based on the signal power difference and/or the beam pattern gain difference and may include, in the beam coverage information, the energy detection threshold adjustment. The energy detection threshold adjustment may be used by the second wireless communication device to adjust a reference energy detection threshold for determining whether a channel is clear for transmission during channel sensing in real-time operations. The reference energy detection threshold may be a predetermined value, and may be defined by regulations, for example. Additionally or alternatively, the second wireless communication device may apply an adjustment to the reference energy detection threshold based on other parameters (e.g., signal power difference, beam gain difference, etc.) in the beam coverage information.

Aspects of the present disclosure can provide several benefits. For example, utilizing a sensing beam that is different from intended or desired transmission beam(s) can allow a wireless communication device to obtain channel sensing results for multiple transmission beams from one channel sensing (e.g., performing a single LBT procedure) instead of performing multiple channel sensing in each intended or desired transmission beam direction separately. Accordingly, channel sensing overhead can be reduced. Storing sensing beam coverage information at a wireless communication device allows the wireless communication device to select a suitable sensing beam for channel sensing during real-time operations. Including parameters, such signal power difference, beam gain difference, spatial angular difference, etc., in the sensing beam coverage information allows a wireless communication device to adjust a channel sensing detection threshold so that the difference in sensitivity between a sensing beam and a transmission can be compensated. Accordingly, channel sensing and/or spectrum sharing performance may not be impacted by the use of a sensing beam different than a transmission beam.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-

105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support time-stringent communications with ultra-reliable and redundant links for time-stringent devices, such as the UE 115e. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PS S from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may operate over a mmWave band (e.g., at 60 GHz). Due to the high pathloss in the mmWave band, the BSs 105 and the UEs 115 may utilize directional beams to communicate with each other. For instance, a BS 105 and/or a UE 115 may be equipped with one or more antenna panels or antenna arrays with antenna elements that can be configured to focus transmit signal energy and/or receive signal energy in a certain spatial direction and within a certain spatial angular sector or width. In general, a BS 105 and/or a UE 115 may be capable of generating a transmission beam for transmission or a reception beam for reception in various spatial direction or beam directions.

Figure 2:
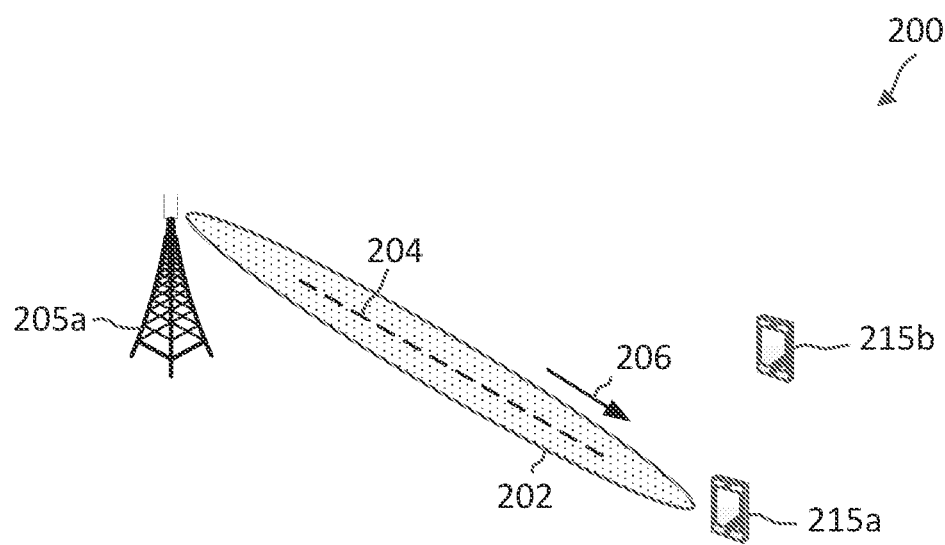
FIG. 2 illustrates a communication scenario according to some aspects of the present disclosure.

FIG. 2 illustrates a communication scenario 200 according to aspects of the present disclosure. The communication scenario 200 may correspond to a communication scenario among BSs 105 and or UEs 115 in the network 100. For simplicity, FIG. 2 illustrates one BS 205 and two UEs 215 (shown as 215a and 215b), but a greater number of UEs 215 (e.g., the about 3, 4, 3, 6, 7, 8, 9, 10, or more) and/or BSs 205 (e.g., the about 2, 3, 4 or more) may be supported. The BS 205 and the UEs 215 may be similar to the BSs 105 and the UEs 115, respectively.

In the scenario 200, the BS 205 may serve the UE 215a. In some instances, the UE 215b may be served by the BS 205. In other instances, the UE 215b may be served by another BS (e.g., another BS 105 or 205). In such instances, the UE 215b and the other BS can be operated by the same network operating entity as the BS 205 or a different network operating entity than the BS 205 Further, in some instances, the UE 215b and the other BS may utilize the same RAT as the BS 205 and the UE 215a. In other instances, the UE 215b and the other BS may utilize a different RAT than the BS 205 and the UE 215a. For instance, the BS 205 and the UE 215a may be NR-U devices, and the other BS and the UE 215b may be WiFi devices. NR-U may refer to the deployment of NR over an unlicensed spectrum.

The BSs 205 and the UEs 215 may communicate over a mmWave band. The mmWave band may be at any mmWave frequencies (e.g., at 20 GHz, 30 GHz, 60 GHz or higher). As explained above, the high mmWave frequencies can have a high pathloss, and a device operating over such frequencies may use beamforming for transmission and/or reception to compensate the high signal attenuation. For instance, the BS 205 may be capable of generating a number of directional transmission beams in a number of beam or spatial directions (e.g., about 2, 4, 8, 16, 32, 64 or more) and may select a certain transmission beam or beam direction to communicate with the UE 215a based on the location of the UE 215a in relation to the location of the BS 205 and/or any other environmental factors such as scatterers in the surrounding. For example, the BS 205 may select a transmission beam that provides a best quality (e.g., with the highest receive signal strength) for communication with the UE 215a. The UE 215a may also be capable of generating a number of directional transmission beams in a number of beam or spatial directions (e.g., about 2, 4, 8 or more) and may select a certain transmission beam that provides the best quality (e.g., with the highest receive signal strength) to communicate with the BS 205. In some instances, the BS 205 and the UE 215a may perform a beam selection procedure with each other to determine a best UL beam and a best DL beam for communications.

In the illustrated example of FIG. 2, the BS 205 may transmit a transmission to the UE 215a using a transmission beam 202 in a direction 206 along a line-of-sight (LOS) path 204, and the UE 215a may use a reception beam in the reverse direction (of the direction 206) to receive the transmission. When the transmission beam 202 is narrow, the transmission beam 202 from the BS 205 to the UE 215a may not cause any interference or a minimal interference to the nearby UE 215b.

Figure 3:
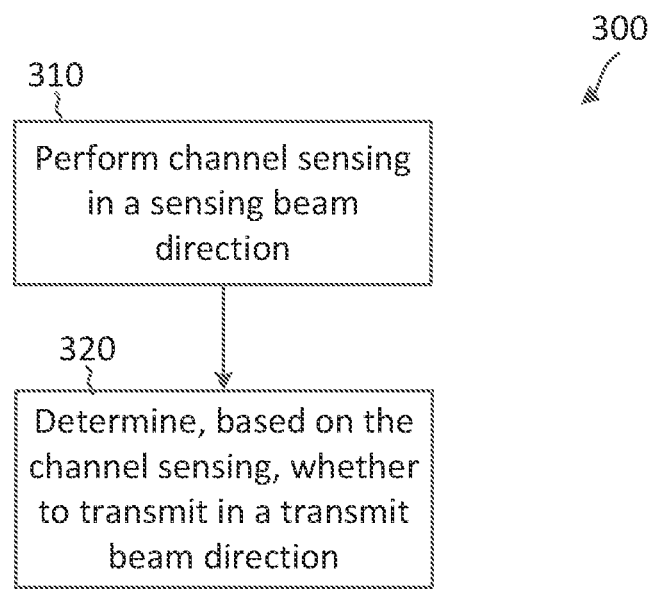
FIG. 3 illustrates a channel access method according to some aspects of the present disclosure.

FIG. 3 illustrates a channel access method 300 according to some aspects of the present disclosure. The method 300 may be employed by BSs such as the BSs 105 and/or UEs such as the UEs 115. In particular, a wireless communication device (e.g., a BS or a UE) may determine which channel access procedure (s) to use for channel access in an unlicensed band, for example, in the mmWave range or sub-THz range, using the method 300. In some aspects, the wireless communication device may be a BS similar to the BS 105, 205, and/or 1200 and may utilize one or more components, such as the processor 1202, the memory 1204, the beam coverage module 1208, the transceiver 1210, the modem 1212, and the one or more antennas 1216 with reference to FIG. 12, to execute the actions of the method 300. In other aspects, the wireless communication device may be similar to a UE such as the UEs 115, and/or a wireless communication device 1300, and may utilize one or more components, such as the processor 1302, the memory 1304, the beam coverage module 1308, the transceiver 1310, the modem 1312, and the one or more antennas 1316 with reference to FIG. 13, to execute the actions of the method 300.

At block 310, a wireless communication device (e.g., a BS 105, 1200, a UE 115, or a wireless communication device 1300) performs channel sensing in a sensing beam direction. The wireless communication device may use receive beamforming to perform the channel sensing. In some aspects, performing the channel sensing includes performing a directional LBT. In this regard, performing the channel sensing may include obtaining signal energy measurements in the sensing beam direction for a pre-determined amount of time.

At block 320, based on the channel sensing performed at block 310, the wireless communication device determines whether to transmit in a transmit beam direction. For example, the wireless communication device may compare the signal energy measurements obtained at block 310 to a threshold, and determine based on the comparison whether the channel is available in the transmit beam direction.

Figure 4:
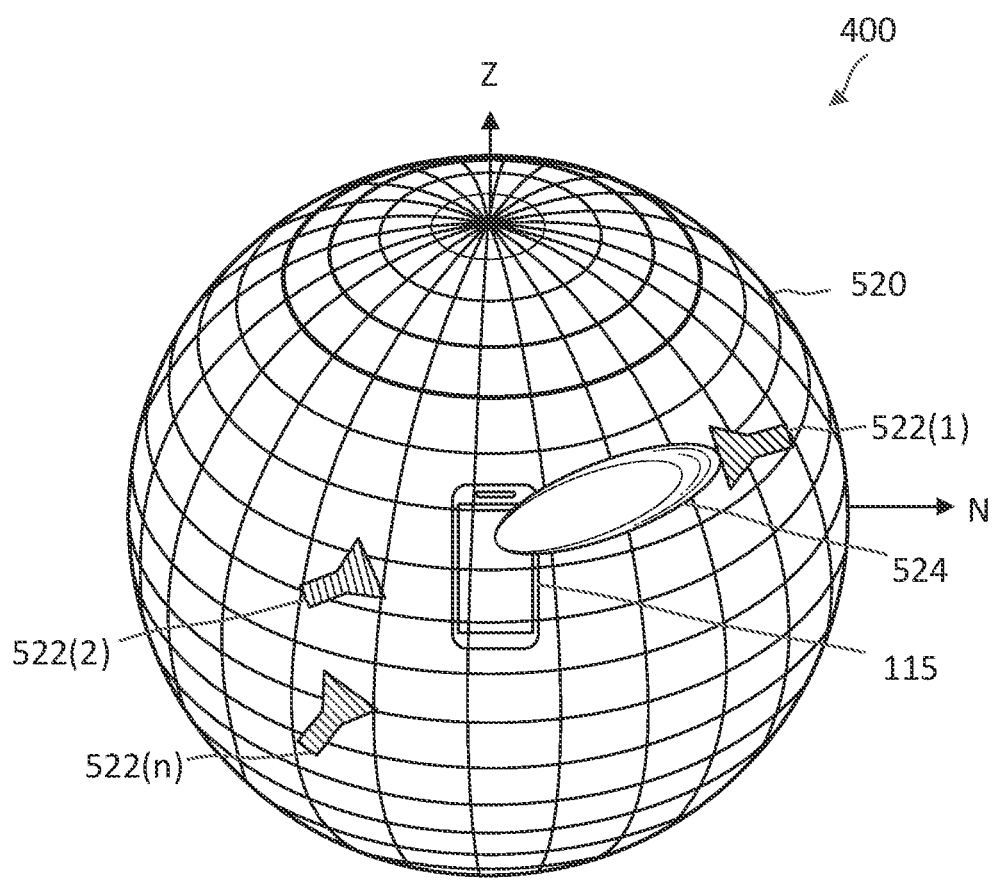
FIG. 4 illustrates a direct far field (DFF) measurement setup of a wireless device according to some aspects of the present disclosure.

FIG. 4 illustrates a direct far field (DFF) measurement setup 400 of a wireless device according to some aspects of the present disclosure. The measurement setup 400 may be employed by BSs such as the BSs 105 and UEs such as the UEs 115 in a network such as the network 100 for communications. The description of setup 400 described below is directed to measuring RF radiated from a device under test (DUT) such as the UE 115. However, the present disclosure is not so limited and the measurement setup 400 may be applied to any wireless device. For example, the measurement setup 400 may be applied to the BS 105. The measurement setup 400 may be applied to measuring a transmission beam 524 generated by the UE 115. For example, the measurement setup 400 may measure the effective isotropic radiated power (EIRP) of the transmission beam 524 at multiple spatial locations with respect to the UE 115. In some instances, the EIRP may be measured according to the methods described in 3GPP specification TR 38.810.

In some instances, the measurement setup 400 may be configured as a sphere 520 as shown in FIG. 4. The measurement setup 400 may include a number of RF sensors (e.g., receive antennas and RF processors) 522(1) . . . 522(n) that are configured at a set of locations on sphere 520 to measure the EIRP (e.g. RF energy) radiated from the UE 115. As will be described in detail with reference to FIGS. 6 and 7 below, RF sensors 522(1) . . . 522(n) may be located (e.g., distributed) on the sphere 520 using different spacing configurations. In some aspects, RF sensors 522(1) . . . 522(n) may include an array of discrete receive antennas and RF processors arranged in a sphere 520. In other aspects, RF sensors 522(1) . . . 522(n) may include an array of discrete receive antenna, RF frontends, and processors. In some instances, the RF sensors 522(1) . . . 522(n) may be part of a wireless device such as a BS 105 or a UE 115. The RF sensors 522(1) . . . 522(n) may record measurements of signals associated with transmission beam 524. The recorded measurements may be processed to determine whether the UE 115 satisfies an interference condition based on the recorded signal measurements. Each of the measurements may be recorded at a location on the sphere 520. For example, each of the locations may be defined by an azimuth angle with respect to axis N and an elevation angle with respect to axis Z.

Figure 5A:
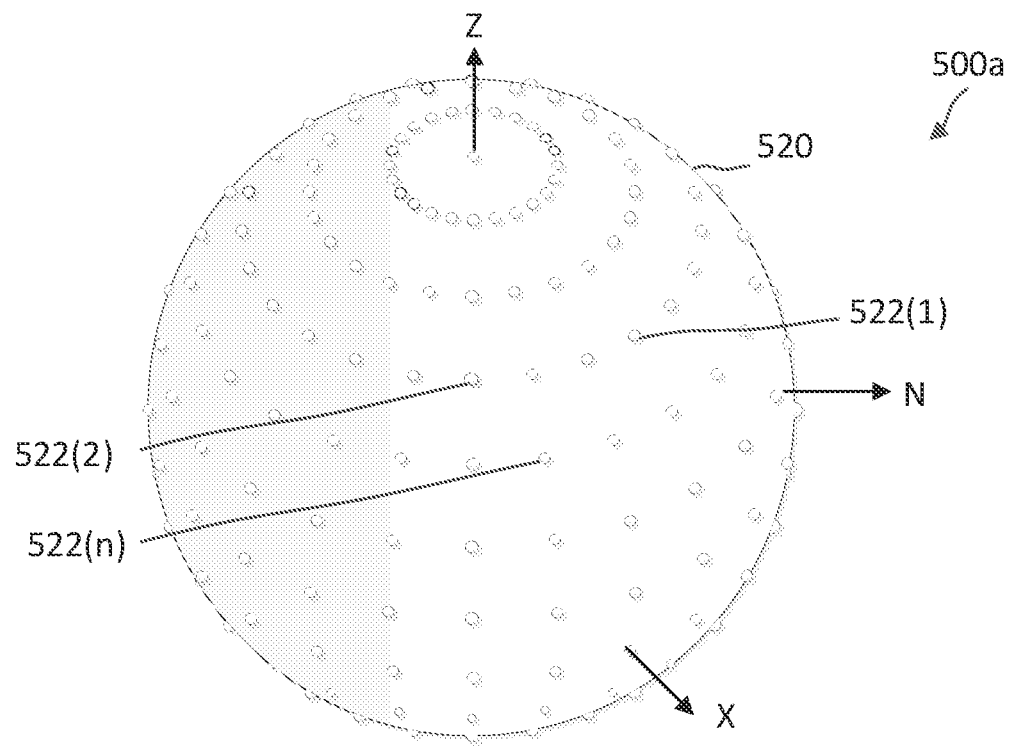
FIG. 5A illustrates a DFF measurement setup of a wireless device according to some aspects of the present disclosure.

FIG. 5A illustrates a direct far field (DFF) measurement setup 500a of a wireless device according to some aspects of the present disclosure. The measurement setup 500a may be employed by BSs such as the BSs 105 and UEs such as the UEs 115 in a network such as the network 100 for communications. The description of measurement setup 500a described below is directed to measuring RF radiated from a device under test (DUT) such as the UE 115. However, the present disclosure is not so limited and the measurement setup 500a may be applied to any wireless device. The measurement setup 500a may be applied to measuring a transmission beam 524 associated with the UE 115. For example, the measurement setup 500a may measure the EIRP of the transmission beam 524. In some instances, the measurement setup 500a may be spatially configured as a sphere 520 as shown in FIG. 5A. The measurement setup 500a may include a number of RF sensors (e.g., receive antennas and RF processors) 522(1) . . . 522(n) that are configured at a set of locations to measure the RF energy radiated from the wireless device.

RF sensors 522(1) . . . 522(n) may be located on (e.g., distributed across) the surface of the sphere 520. RF sensors 522(1) . . . 522(n) may include an array of discrete receive antennas and RF processors arranged in a sphere 520. Each of the measurements may be recorded at a location on the sphere 520. For example, each of the locations may be defined by an azimuth angle with respect to axis N and an elevation angle with respect to axis Z (e.g. discrete elevation angles, each elevation angle defining the plane). The constant step size grid type has the azimuth and elevation angles uniformly distributed. For example, the RF sensors 522(1) . . . 522(n) may be distributed in a uniform planar manner (e.g., constant step size) such that for each of the configured planes (X-N planes) along the Z axis RF sensors 522(1) . . . 522(n) may be located within each configured plane (each configured plane having the same elevation angle) and having a different azimuth angle. The difference in the azimuth angle between RF sensors 522(1) . . . 522(n) may be the same (e.g., evenly spaced). In some instances, the RF sensors 522(1) . . . 522(n) may be part of a wireless device such as a BS 105. The RF sensors 522(1) . . . 522(n) may record measurements (e.g., EIRP) of signals associated with a transmission beam (e.g., transmission beam 524). The recorded measurements may be processed to determine whether the wireless device (e.g., UE 115) satisfies an interference condition based on the recorded signal measurements.

Figure 5B:
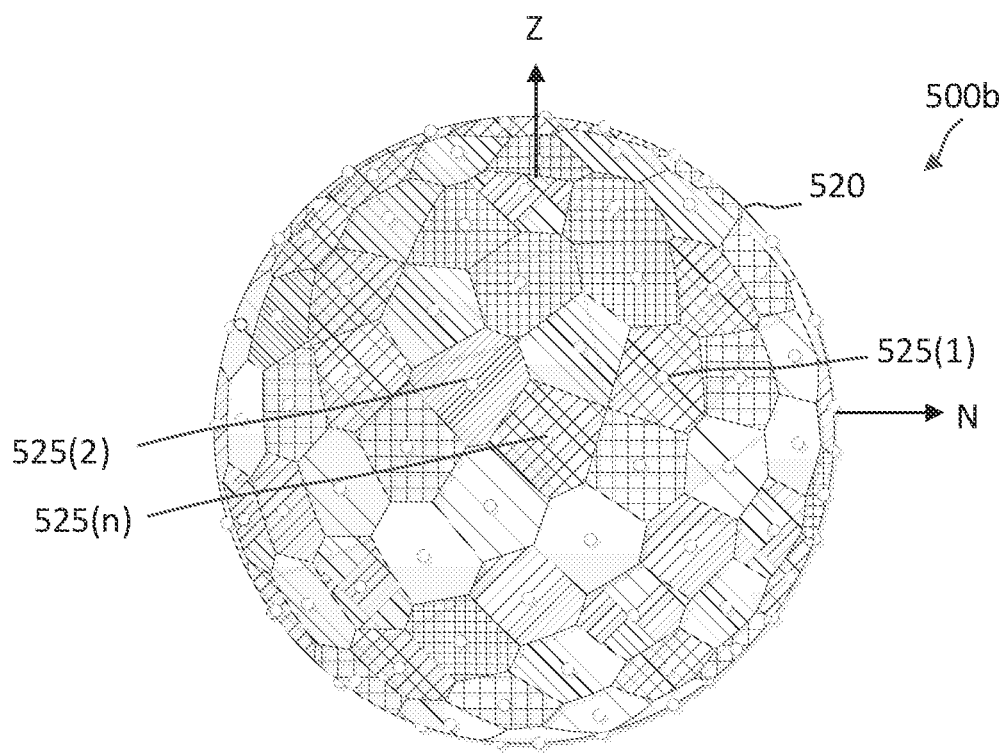
FIG. 5B illustrates a DFF measurement setup of a wireless device according to some aspects of the present disclosure.

FIG. 5B illustrates a direct far field (DFF) measurement setup 500b of a wireless device according to some aspects of the present disclosure. The measurement setup 500b may be employed by BSs such as the BSs 105 and UEs such as the UEs 115 in a network such as the network 100 for communications. The description of measurement setup 500b is directed to measuring RF radiated from a device under test (DUT) such as UE 115. However, the present disclosure is not so limited and the measurement setup 500b may be applied to any wireless device. For example, the measurement setup 500b may be applied to BS 105. The measurement setup 500b may be applied to measuring a transmission beam 524 associated with the UE 115. For example, the measurement setup 500b may measure the EIRP of the transmission beam 524. In some instances, the measurement setup 500b may be configured as a sphere 520 as shown in FIG. 5B. The measurement setup 500b may include a number of RF sensors (e.g., receive antennas and RF processors) 522(1) . . . 522(n) that are configured at a set of locations to measure the RF energy radiated from the UE 115. Tiles 525(1) . . . 525(n) may represent the tiles (e.g., regions) within which RF sensors 522(1) . . . 522(n) respectively that measure the RF parameters associated with the transmission beam (e.g. transmission beam 524) radiated from the wireless device. Tiles 525(1) . . . 525(n) may be shaped as polygons and configured as Voronoi regions.

Figure 6:
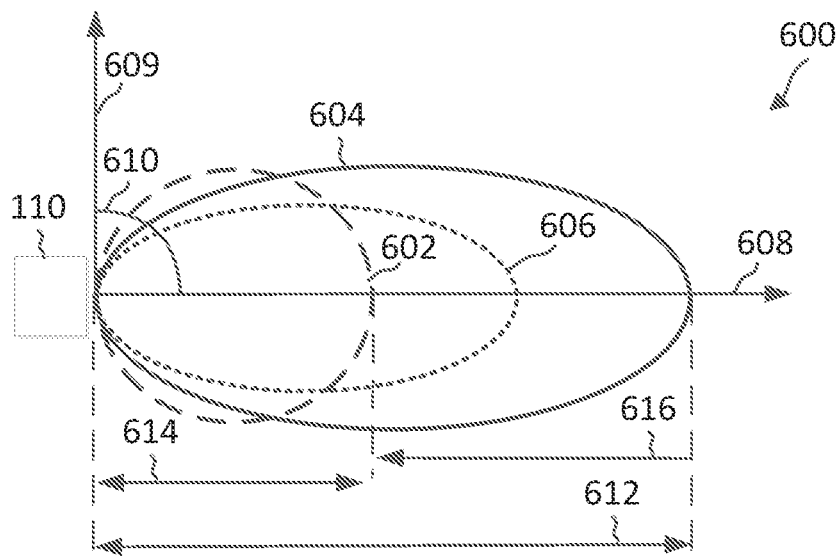
FIG. 6 illustrates a wireless communication scenario for beam-based transmission and channel sensing according to some aspects of the present disclosure.

FIG. 6 illustrates a wireless communication scenario 600 configured for beam-based transmission and channel sensing according to some aspects of the present disclosure. The scheme 600 is performed by a wireless communication device 110, which may include test equipment. For example, the wireless communication device 110 may include a manufacturing/calibration device that includes a measurement setup, such as one or more of the setups 400, 500a, 500b described above. The wireless communication device 110 may be configured to determine beam coverage information for use in a channel sensing procedure (e.g., LBT). For example, a second wireless communication device may utilize one or more sensing beams from a set of candidate sensing beams for channel sensing based on the beam coverage information provided by the wireless communication device 110. The one or more sensing beams may or may not be the same as a transmission beam to be used for a transmission for which the channel sensing is performed.

In the scenario 600, the illustrated pattern 602 may represent the distribution or pattern of a signal energy or signal power of the sensing beam pattern 602. For example, the pattern 602 may represent the received signal energy distribution, after applying a conductive power factor to signals received using the pattern 602. That is, the pattern 602 is a signal power pattern. The transmit beam pattern 604 may represent a distribution of signal power, such as effective isotropic radiated power (EIRP) of a signal transmitted based on the pattern 604. Further, FIG. 6 illustrates a signal gain pattern 606 associated with the transmit beam pattern 604. In the illustrated scenario, the sensing beam pattern 602 and the transmit beam patterns 604, 606 are associated with a same beam direction 608. The beam direction 608 may be described as an angle 610 with respect to an axis 609, in some aspects. For example, the angle of the direction 608 may be referenced as θ.

The scenario 600 may be associated with a scheme for validating or confirming that the sensing beam pattern 602 is suitable to use for sensing a channel in a shared frequency band before transmitting the beam direction 608 based on the transmit beam pattern 604. In some aspects, determining whether the sensing beam pattern 602 is suitable to use for channel sensing includes determining a difference between the a max signal power 612 of the transmit beam pattern 604 to the signal power 614 of the sensing beam pattern 602 in the direction of the transmit beam pattern 604, which is the same direction as the beam direction of the sensing beam pattern 602. The difference in signal power 616 may be determined by subtracting the signal power 614 of the sensing beam pattern 602 in the direction of the transmit beam pattern 604 from the max signal power 612, for example. In other aspects, validating the sensing beam pattern 602 may include comparing a maximum signal gain of the gain pattern 606 to a gain pattern associated with the sensing beam pattern 602. In some aspects, the gain pattern associated with the sensing beam pattern 602 may be different from the sensing beam pattern 602.

In some aspects, a beam coverage determination scheme similar to the scheme 600 may be used to check or validate a candidate sensing beam with respect to a desired transmit beam that is associated with a different beam direction from the candidate sensing beam. When the sensing beam and the desired transmit beam are associated with different beam directions, the beams may be described as mismatched. For example, and some aspects, it may be desirable to identify or validate a single sensing beam or being pattern that can be used for channel sensing for a plurality of different desired transmit beam directions. For example, a wireless communication device may desire to transmit using two or more transmit beam directions. Instead of performing a LBT procedure for each of the two or more desired transmit beam directions, it may be advantageous to perform a single LBT procedure using a sensing beam pattern or sensing beam direction that is suitable for sensing a channel in order to transmit in the two or more desired transmit beam directions. As similarly described above with respect to the scenario 600, determining whether a candidate sensing beam or being pattern is suitable for channel sensing (e.g., LBT) may include comparing, for each of the plurality of transmit beam directions, a max signal power and/or signal gain of the desired transmit beam pattern in the desired transmit beam direction to a candidate sensing beam signal power and/or signal gain in the desired transmit beam direction.

Figure 7:
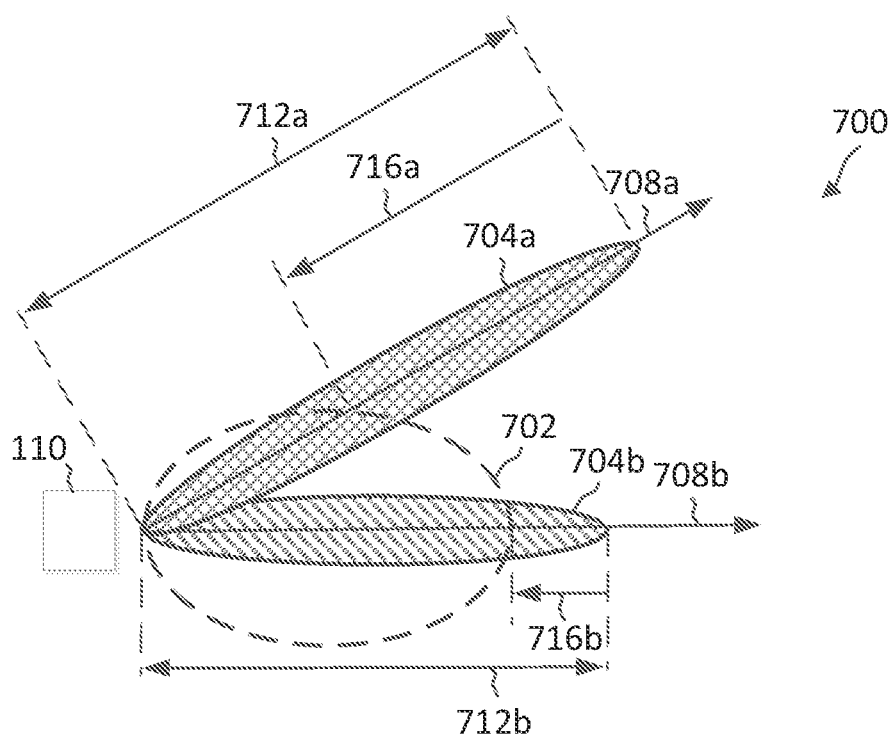
FIG. 7 illustrates a wireless communication scenario that includes using a single sensing beam to perform channel sensing for a plurality of desired transmit beams according to some aspects of the present disclosure.

FIG. 7 illustrates a scheme 700 for validating a candidate sensing beam pattern 702 four a plurality of transmit beam patterns 704a, 704b. In some aspects, the sensing beam pattern 702 may be described more generally as a sensing beam direction 702. Similarly, the transmit beam patterns 704a, 704b may be described more generally as transmit beam directions 704a, 704b. However, it will be understood that the beam patterns 702, 704a, 704b, may be associated with beam widths in addition to being directions.

In the scheme 700, the wireless communication device 110 can generate one or more sensing beams for channel sensing and one or more transmission beams for transmission. The one or more sensing beams may be referred to as candidate sensing beams where the wireless communication device 110 may select for use in channel sensing, for example, in beam direction(s) of one or more of the transmission beams. In FIG. 7, a candidate sensing beam pattern 702, a first transmit beam pattern 704a, and a second transmit beam pattern 704b of the wireless communication device 110 are shown. In some aspects, a manufacturing/calibration device may utilize the scheme 700 to determine whether the candidate sensing beam pattern 702 is suitable to use for channel sensing for the first desired transmit beam pattern 704a and the second desired transmit beam pattern 704b. The first transmit beam pattern 704a is associated with a first transmit beam direction 708a, and the second transmit beam pattern 704b is associated with a second transmit beam direction 708b. The second transmit beam direction 708b is aligned with the sensing beam direction of the sensing beam pattern 702, and the first transmit beam direction 708a is misaligned with the beam direction of the sensing beam pattern 702.

The manufacturing/calibration device (e.g., test equipment) may determine whether the sensing beam pattern 702 is a valid sensing beam for the first transmit beam pattern 704a based on a max signal power 712a of the first transmit beam pattern 704a in the first transmit beam direction 708a, and the signal power of the sensing beam pattern 702 in the first transmit beam direction 708a. As an example, the beam patterns 702, 704a, 704b may represent signal power patterns in the corresponding beam directions. Thus, the signal power of the sensing beam pattern 702 in the first transmit beam direction 708a is shown as the intersection of the sensing beam pattern 702 with the first transmit beam direction 708a. For example, the manufacturing/calibration device may determine a signal power difference 716a by comparing (e.g., subtracting) the signal power of the sensing beam pattern 702 in the first transmit beam direction 708a with the first maximum transmit signal power 712a of the first transmit beam pattern 704a. In some aspects, the manufacturing/calibration device may compare the signal power difference 716a, which may be referred to as delta signal power, to a threshold signal power difference. In some aspects, the first maximum signal power 712a and the signal power of the sensing beam pattern 702 in the first transmit beam direction 708a may be effective isotropic radiated power (EIRP) measurements, and the signal power difference 716a may be a difference in EIRP. However, it will also be understood that beam gain may be used instead of or in addition to signal power.

As similarly performed for the first transmit beam pattern 704a, the wireless communication device 110 determines whether the sensing beam pattern 702 is a valid sensing beam for the second transmit beam pattern 704b based on a max signal power 712b of the second transmit beam pattern 704b in the second transmit beam direction 708b, and the signal power of the sensing beam pattern 702 in the second transmit beam direction 708b. For example, the wireless communication device 110 may determine a signal power difference 716b by comparing (e.g., subtracting) the signal power of the sensing beam pattern 702 in the second transmit beam direction 708b with the second maximum transmit signal power 712b of the second transmit beam pattern 704b.

As another example, the beam patterns 702, 704a, 704b may represent gain patterns in the corresponding beam directions. For example, the wireless communication device 110 may determine a signal gain difference 716a by comparing (e.g., subtracting) the signal gain of the sensing beam pattern 702 in the first transmit beam direction 708a with a first maximum transmit signal gain 712a of the first transmit beam pattern 704a. In another example, the wireless communication device 110 may determine a signal gain difference 716b by comparing (e.g., subtracting) the signal gain of the sensing beam pattern 702 in the second transmit beam direction 708b with a second maximum transmit signal gain 712b of the second transmit beam pattern 704b.

These procedures may be used for each of a plurality of desired transmit beam directions, which may include fewer or more transmit beam directions than what is shown in FIG. 7. In this regard, the wireless communication device 110 may use a logical AND operation based on the results of comparing each of the signal power differences 716a, 716b to a respective threshold. If the sensing beam pattern 702 meets the threshold criteria for each of the desired transmit beam patterns 704a, 704b, the wireless communication device 110 may use the sensing beam pattern 702 to sense the channel and determine based on the sensing whether to transmit in the first transmit beam direction 708a and the second transmit beam direction 708b.

In some aspects, a manufacturing and/or calibration device may be used to obtain beam coverage information, including the signal power, signal gain, signal power difference, and/or signal gain difference measurements for each of a plurality of candidate sensing beam directions with respect to each of a plurality of desired transmit beam directions. In some aspects, the manufacturing and/or calibration device may include, in beam coverage information, a sensing beam eligibility or validation indication for each of a plurality of sensing beams with respect to each of a plurality of desired transmit beams. Accordingly, the wireless communication device 110 may select the sensing beam by checking the beam coverage information, including the sensing beam eligibility or validation indication for a particular sensing beam. The beam coverage information may be provided in one or more lists, lookup tables, or other data entities, and may be stored in a memory of the wireless communication device 110.

Figure 8A:
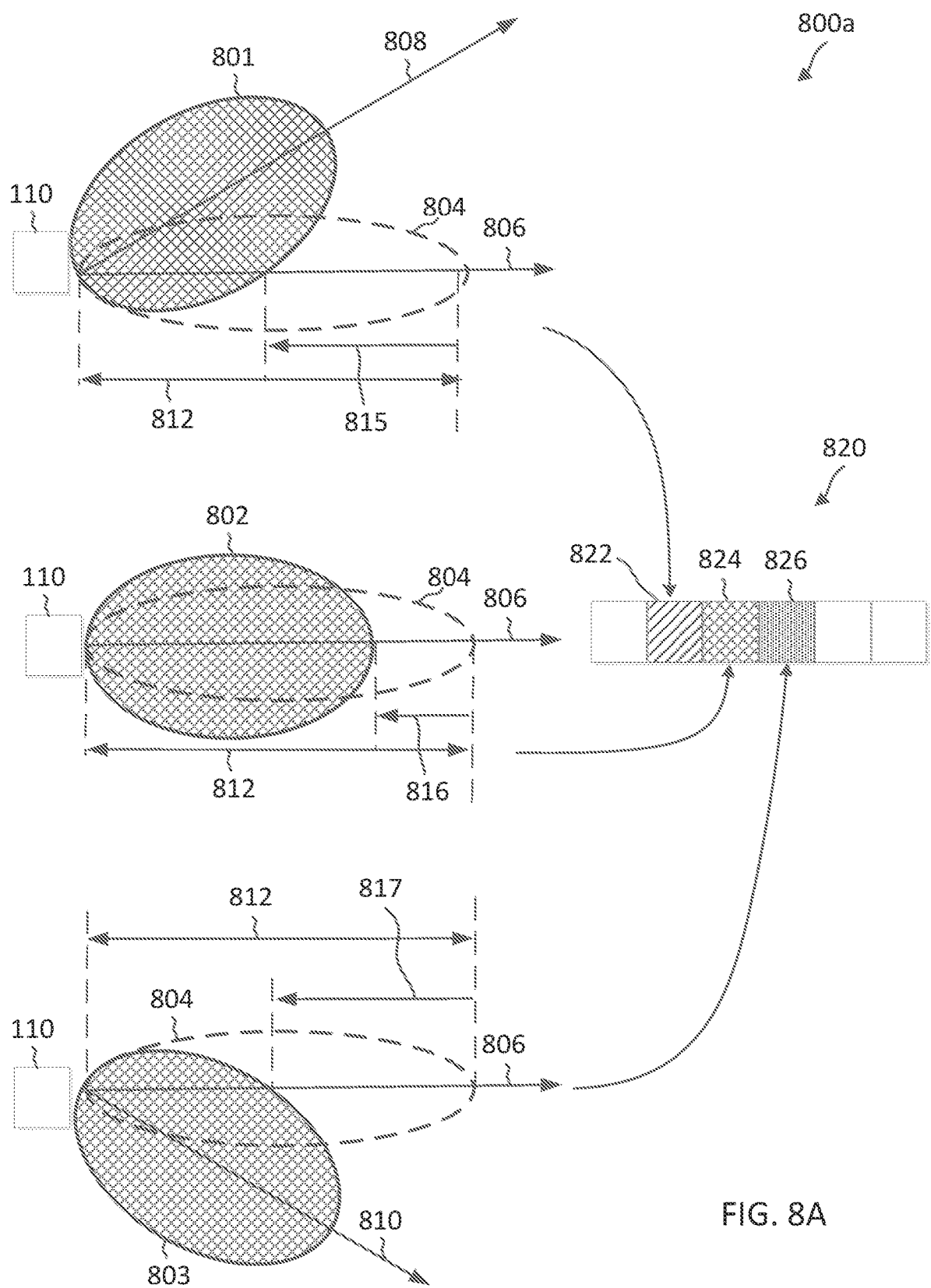
FIG. 8A illustrates a scheme for assessing beam coverage of a plurality of candidate sensing beams with respect to a desired transmit beam according to some aspects of the present disclosure.
Figure 8B:
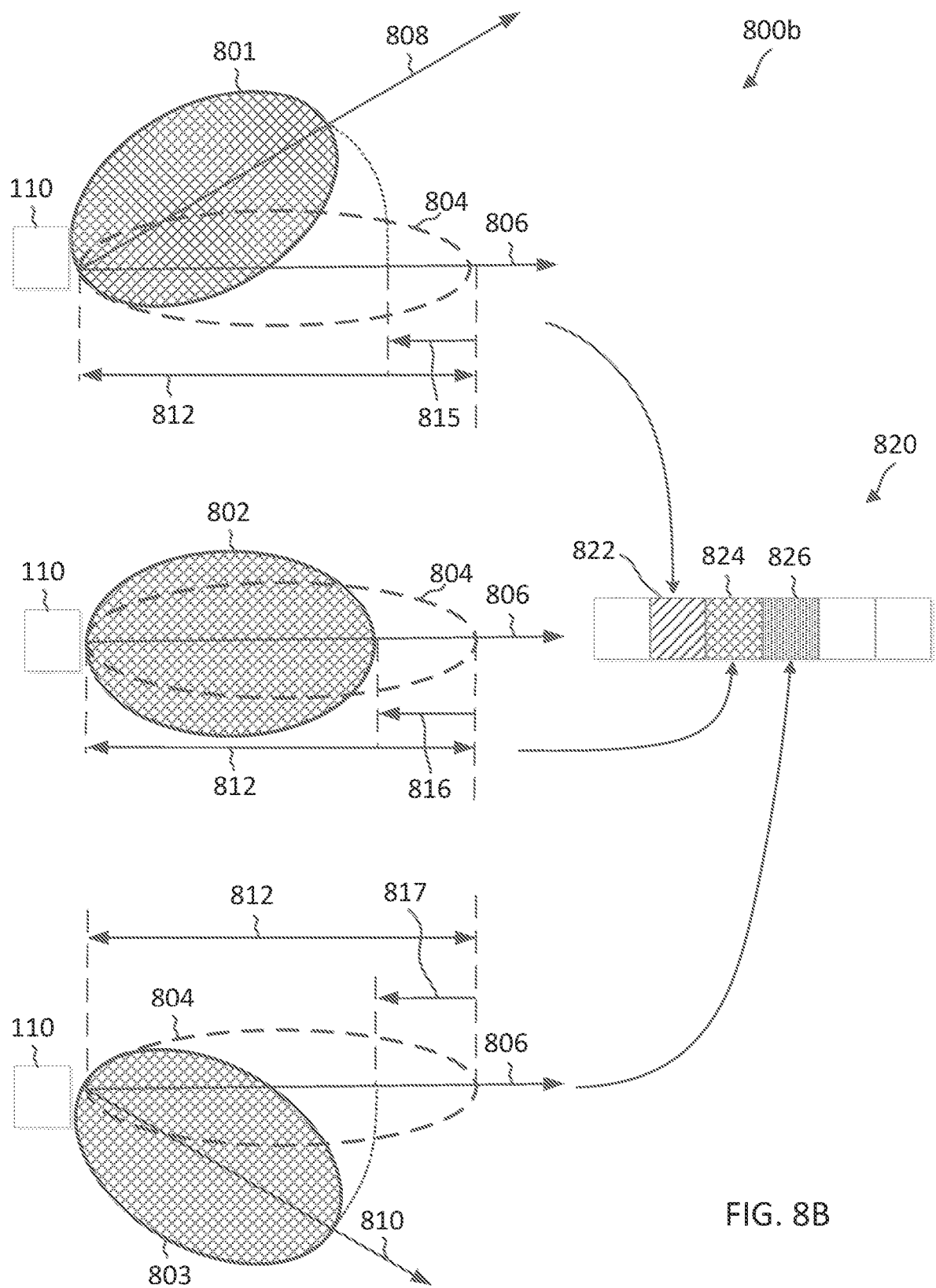
FIG. 8B illustrates a scheme for assessing beam coverage of a plurality of candidate sensing beams with respect to a desired transmit beam according to some aspects of the present disclosure.

FIGS. 8A and 8B illustrate schemes 800a, 800b for assessing beam coverage of a plurality of candidate sensing beams with respect to a desired transmit beam, according to some aspects of the present disclosure. In the schemes 800a, 800b the wireless communication device 110 can generate one or more sensing beams for channel sensing and one or more transmission beams for transmission. The one or more sensing beams may be referred to as candidate sensing beams where the wireless communication device 110 may select for use in channel sensing, for example, in beam direction(s) of one or more of the transmission beams. A plurality of candidate sensing beam patterns 801, 802, 803, and a transmit beam pattern 804 are shown. In some aspects, a manufacturing/calibration device may utilize the schemes 800a, 800b to assess the plurality of candidate sensing beam patterns (e.g., 801, 802, 803), with respect to the transmit beam pattern 804 associated with a transmit beam direction 806. Based on the assessment of each candidate sensing beam, the manufacturing/calibration device is configured to update or populate a list 820 including beam coverage information for each of the candidate sensing beams with respect to the transmit beam pattern 804. The beam coverage information stored in the list 820 may include a maximum signal power 812 (or maximum signal gain 812) of the transmit beam pattern 804 in the transmit beam direction 806, a signal power (or signal gain) of the candidate sensing beams 801, 802, 803, in the transmit beam direction 806, a signal power difference (e.g., 815, 816, 817), and angle associated with the candidate sensing beam direction (e.g., 808, 810), and angle associated with the transmit beam direction 806, a quasi-co-location (QCL) relation of each of the candidate sensing beam patterns 801, 802, 803 with respect to the transmit beam pattern 804, an energy detection threshold (EDT), an EDT adjustment, a result of a beam coverage test or assessment, and/or any other suitable beam-related parameter or combinations thereof. For example, the beam coverage information may indicate whether a candidate sensing beam satisfies one or more conditions (e.g., difference in signal power from maximum transmission signal power) for one or more transmission beams.

For example, referring to the scheme 800a, the manufacturing/calibration device updates the beam coverage information list 820 to include: first beam coverage information 822 for the first candidate sensing beam pattern 801, second beam coverage information 824 for the second candidate sensing beam pattern 802, and third beam coverage information 826 for the third candidate sensing beam pattern 803. The list 820 is associated with the same transmit beam pattern 804 and/or the same transmit beam direction 806. However, it will be understood that the list 820 may further include beam coverage information for other transmit beam patterns and/or other transmit beam directions. Stated differently, the manufacturing/calibration device may be configured to generate a plurality of beam coverage information lists, where each list is associated with a different transmit beam pattern and/or a different transmit beam direction. The manufacturing or calibration device may store the beam coverage information at the wireless communication device 210 at the end of the test. In some instances, the manufacturing or calibration device may transfer the beam coverage information to a device that can configure the wireless communication device 210 with the beam coverage information. The beam coverage information list(s) 820 may be provided to wireless communication devices communicating in a network, such as the BSs 105 and/or the UEs 115 in the network 100, for assessing or validating candidate sensing beams for directional channel sensing.

In the scheme 800a shown in FIG. 8A, the signal power differences 815, 816, 817 (alternatively or additionally, the signal gain differences) are determined based on the signal power (or beam gain) of the candidate sensing beam patterns in the transmit beam direction 806. In other aspects, signal power differences or signal gain differences may be determined based on a projection of the signal power (or signal gain) of the candidate sensing beam patterns in the transmit beam direction 806. In other words, instead of determining the signal power of a candidate sensing beam oriented in a sensing beam direction, the manufacturing/calibration device may determine a signal power difference based on a maximum signal power of the transmit beam in the transmit beam direction 806, and a maximum signal power of the sensing beam pattern in the respective sensing beam direction (e.g., 808).

In this regard, FIG. 8B illustrates a scheme 800b in which the signal power differences (e.g., 815, 816, 817), are determined based on a comparison of the maximum signal power of the transmit beam pattern 804 with respect to the transmit beam direction 806 and the maximum signal power of the sensing beam pattern (e.g., 801, 803) with respect to the sensing beam direction (e.g., 808, 810) projected onto the transmit beam direction 806. That is, the manufacturing/calibration device may measure a first receive signal power of the transmit beam pattern 804 along the beam direction 806, measure a second receive signal power of the sensing beam pattern (e.g., 801 or 803) along a corresponding sensing beam direction (e.g., 808, 810), project the second receive signal power of the sensing beam pattern onto the transmit beam direction 806 to obtain a third receive signal power, and compare the first receive signal power to the third receive power (e.g., computing a signal power difference by subtracting the first receive signal power from the third receive power). Accordingly, and some aspects, the comparison shown in the scheme 800b may be described as comparing a projection of the signal power (or signal gain or other signal measurement) for each of the candidate sensing beam patterns 801, 802, 803 in the transmit beam direction 806 with a corresponding signal power (or signal gain or other signal measurement) of the transmit beam pattern 804.

Figure 9A:
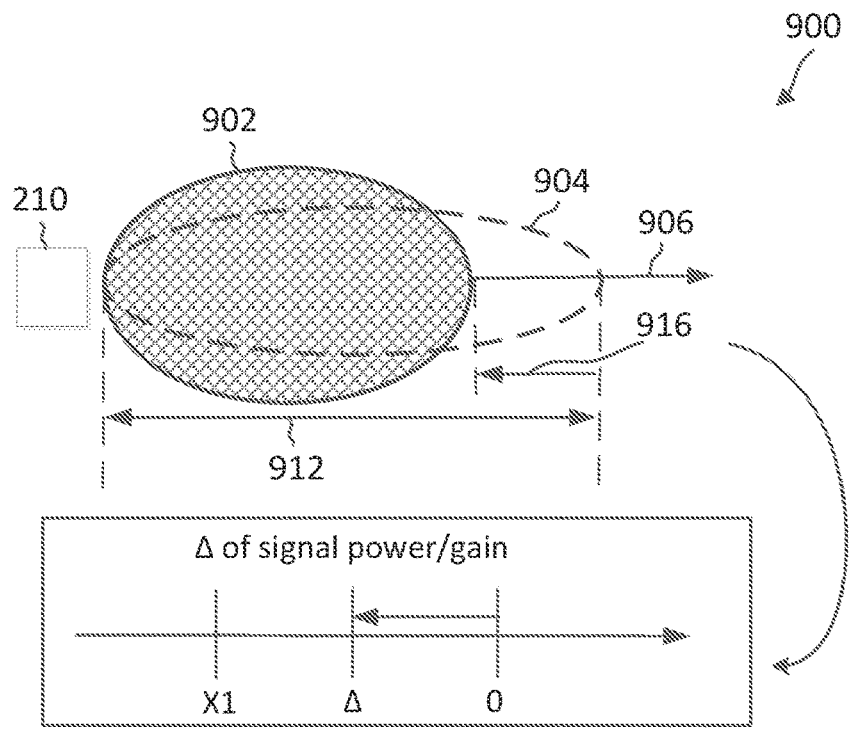
FIG. 9A illustrates a scheme for assessing beam coverage of a plurality of candidate sensing beams with respect to a desired transmit beam according to some aspects of the present disclosure.
Figure 9B:
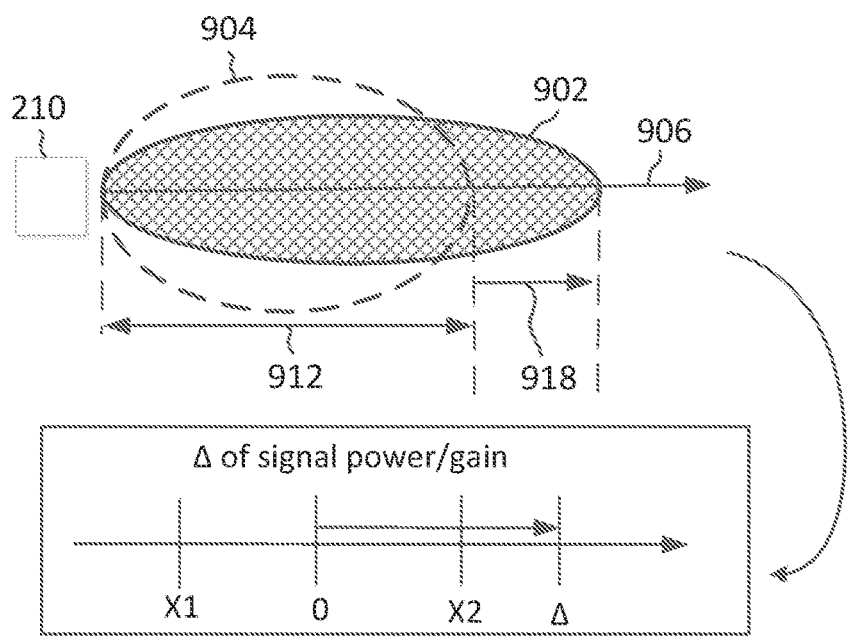
FIG. 9B illustrates a scheme for assessing beam coverage of a plurality of candidate sensing beams with respect to a desired transmit beam according to some aspects of the present disclosure.

In this regard, FIGS. 9A and 9B illustrate schemes 900a, 900b for correcting or adjusting signal energy measurements based on the results of a beam coverage test. The schemes 900a, 900b are performed by a manufacturing or calibration device configured to perform the actions described with respect to FIGS. 4-5B, for example. Referring to the scheme 900a, the manufacturing/calibration device determines a signal power difference (or beam gain difference) 916 based on a candidate sensing beam pattern 902 and a transmit beam pattern 904 of a wireless communication device 210, wherein the sensing beam pattern 902 and the transmit beam pattern 904 are associated with a same beam direction 906. The signal power difference 916 may be a difference in EIRP, in some aspects. The signal power difference 916 is determined by subtracting a max signal power 912 of the transmit beam pattern 904 with respect to the transmit beam direction 906 from a signal power of the sensing beam pattern 902 in the direction 906. Accordingly, because the transmit beam pattern 904 is narrower and longer than the sensing beam pattern 902, the signal power difference may be a non-positive value, or negative value, as shown in the plot of FIG. 9A. The wireless communication device 210 compares the signal power difference (or signal gain difference), which is referred to as Δ in the plot, to a non-positive threshold X1. The manufacturing/calibration device determines, based on the signal power difference 916 (Δ) being greater than the non-positive threshold X1, that the sensing beam pattern 902 is valid or eligible for a channel sensing procedure associated with the transmit beam direction 906 and/or transmit beam pattern 904.

Further, the wireless communication device 210 may determine, based on the signal power difference, to adjust a signal energy threshold (e. g., EDT) for channel sensing. For example, during real time operations, the wireless communication device 210 may perform an LBT using an adjusted EDT that is adjusted by an amount equal or related to the signal power difference 916. In some aspects, the manufacturing/calibration device may save the adjusted EDT as beam coverage information, as described above. For example, the wireless communication device 210 may save or record the adjusted EDT value in a beam coverage information list or look up table, such that the adjusted EDT value corresponds to a given candidate sensing beam direction and one or more transmit beam directions. The manufacturing or calibration device may store the beam coverage information at the wireless communication device 210 at the end of the test. In some instances, the manufacturing or calibration device may transfer the beam coverage information to a device that can configure the wireless communication device 210 with the beam coverage information. The wireless communication device 210 operating in a network (e. g., a BS, UE, etc.) may recall or retrieve the adjusted EDT value from the configured beam coverage information (e. g., look up table), and performing channel sensing based on the adjusted EDT value.

In the schemes 600, 700, 800a, 800b, 900a illustrated above, the candidate sensing beams were shown as wider (e.g., a wider beam width) and shorter (e.g., a weaker signal power) than the respective desired transmit beam patterns. Accordingly, in the schemes 600, 700, 800a, 800b, 900a, the threshold values used for comparing the signal power difference (or signal gain difference) of a given candidate sensing beam pattern may be negative (e. g., X1), and comparing the signal power difference to the threshold may include determining whether the signal power difference is greater than the negative threshold value. Thus, if the signal power difference for a given candidate sensing beam is greater than the negative threshold, the candidate sensing beam may be validated or determined eligible for channel sensing by the wireless communication device prior to the wireless communication device transmitting in the desired transmit beam direction. However, in some scenarios a candidate sensing beam pattern may be narrower (e.g., a narrower beam width) and longer (e.g., a stronger signal power) than a respective desired transmit beam pattern. In these scenarios, the candidate sensing beam is likely to exceed a negative signal power or beam gain threshold.

However, it may be undesirable for a signal power difference or beam gain difference to exceed a negative threshold value by a large amount. For example, if a candidate sensing beam is very narrow relative to the desired transmit beam, there may be one or more issues with channel sensing using the sensing beam pattern. For example, when sensing beam is narrower than a transmission beam, the sensing beam may be more sensitive than the transmission beam. That is, the sensing beam may detect signals from a device at a range that is farther than where the transmission beam may reach. As such, channel sensing result from channel sensing using the sensing beam may indicate that the channel is occupied, causing the wireless communication device not to access the channel even though a transmission using the transmission beam may not cause interference to the device at the farther range. Accordingly, when a sensing beam is narrower or more sensitive than a transmission beam, channel sensing from the sensing beam may be too conservative.

In this regard, FIG. 9B illustrates a scheme 900b for assessing beam coverage of a plurality of candidate sensing beams with respect to a desired transmit beam according to some aspects of the present disclosure. In particular, in the scheme 900b, the wireless communication device 210 is configured to assess a candidate sensing beam pattern 902 for channel sensing with respect to a desired transmit beam pattern 904, where the channel sensing beam pattern 902 is narrower than the desired transmit beam pattern 904. Thus, in the scheme 900b, the wireless communication device 210 is configured to compare the max signal power (or signal gain) 912 of the transmit beam pattern 904 to the signal power of the candidate sensing beam pattern 902 to determine a signal power difference 918 (e.g., by subtracting the max signal power (or signal gain) 912 of the transmit beam pattern 904 from the signal power of the candidate sensing beam pattern 902. Because the candidate sensing beam 902 is narrower and longer (e.g., a stronger signal power) than the transmit beam pattern 904, the signal power difference 918 may be a positive value. The positive signal power difference 918 is sure to satisfy the first threshold X1. However, as explained above, it may also be desirable to use a positive threshold value to determine whether the signal power difference exceeds a second, positive threshold X2. In the scheme 900b, the signal power difference 918 exceeds the positive threshold X2. Thus, the wireless communication device 210 may determine that the candidate sensing beam pattern 902 is not eligible for channel sensing based on the transmit beam pattern 904. However, in some aspects, the wireless communication device 210 may be configured to determine a signal energy threshold adjustment based on the difference between the signal power difference (or signal gain difference) and the positive threshold X2. Accordingly, the wireless communication device 210 may indicate, in beam coverage information, the signal energy threshold adjustment, and a network wireless communication device (e.g., BS, UE) may be configured to use the sensing beam pattern 902 for channel sensing before transmitting in transmit beam direction 906, and apply the signal energy threshold adjustment indicated in the corresponding beam coverage information.

Figure 10:
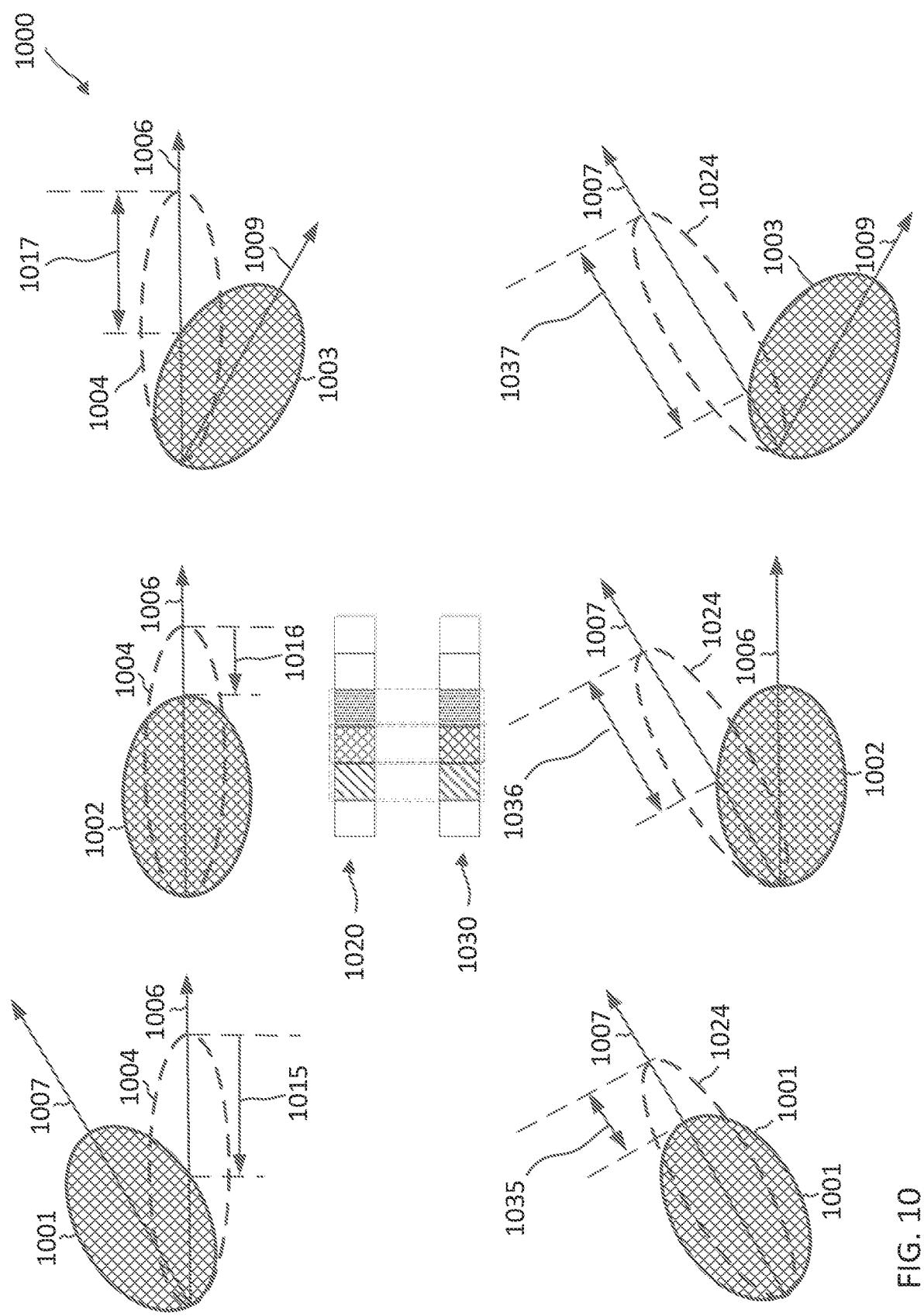
FIG. 10 illustrates a scheme for assessing beam coverage of a plurality of candidate sensing beams with respect to a plurality of desired transmit beams according to some aspects of the present disclosure.

FIG. 10 illustrates a scheme 1000 for assessing beam coverage of a plurality of candidate sensing beams with respect to a plurality of desired transmit beams according to some aspects of the present disclosure. Some aspects of the scheme 1000 may be performed by a manufacturing/calibration device that is configured to perform one or more of the actions described in FIGS. 4-5B, for example. For example, a manufacturing/calibration device may be configured to generate beam coverage information 1020, 1030 based on a plurality of sensing beam patterns (e. g., 1001, 1002, 1003) of a wireless communication device (e.g., UE 115, BS 105, wireless communication device 110, wireless communication device 210) with respect to a first transmit beam pattern 1004 and a second transmit beam pattern 1024 of the wireless communication device. The beam coverage information 1020 is determined or generated based on the first transmit beam pattern 1004, and the beam coverage information 1030 is determined or generated based on the second transmit beam pattern 1024. A similarly described above, the beam coverage information 1020, 1030, may include signal power and/or signal gain measurements for a respective candidate sensing beam pattern with respect to a transmit beam pattern, signal power difference measurements for a respective beam candidate pattern and transmit beam pattern, signal gain difference measurements for a respective beam candidate and transmit beam pattern, differences in pointing angle between a respective candidate sensing beam pattern and a transmit beam pattern, QCL relations between a respective candidate sensing beam pattern and a transmit beam pattern, signal energy thresholds, signal energy threshold adjustments, beam coverage test results, sensing beam eligibility indications, and/or any other suitable beam coverage parameter or combinations thereof.

For example, the beam coverage information 1020 includes beam coverage information for a first candidate sensing beam pattern 1001, a second candidate sensing beam pattern 1002, and a third candidate sensing beam pattern 1003 with respect to a same transmit beam pattern 1004. The candidate sensing beam patterns are associated with respective candidate sensing beam directions (e. g., 1007, 1009) and the transmit beam patterns 1004, 1024 are associated with transmit beam directions 1006, 1007. The manufacturing/calibration device may be configured to determine, for each of the candidate sensing beam patterns 1001, 1002, 1003 with respect to each of the transmit beam patterns 1004, 1024, a signal energy difference (1015, 1016, 1017, 1035, 1036, 1037), and record each of the signal energy differences to a corresponding beam coverage information list 1020, 1030.

In some aspects the manufacturing/calibration device may be configured to perform a beam coverage test for each of the plurality of candidate sensing beam patterns 1001, 1002, 1003 with respect to both the first transmit beam pattern 1004, and the second transmit beam pattern 1005. For example, the manufacturing/calibration device may be configured to apply a logical AND operation to corresponding entries of the beam coverage information lists 1020, 1030 to determine whether each of the candidate sensing beam patterns is eligible or suitable for channel sensing for both the first transmit beam direction 1006, and the second transmit beam direction 1007. For example, if the signal power difference 1017 for the candidate sensing beam pattern 1003 satisfies a threshold (e. g., X1), but the signal power difference 1037 for the candidate sensing beam pattern 1003 does not satisfy the threshold, the manufacturing/calibration device may determine that the candidate sensing beam pattern 1003 is not eligible for use with a channel sensing operation associated with a multi-beam channel access operation in which both the first transmit beam direction 1006 and the second transmit beam direction 1007 are used. In In some aspects, a wireless communication device using the beam coverage information 1020, 1030 may be configured to apply signal energy threshold adjustments for channel sensing based on the beam coverage test described above. For example, if a candidate sensing beam does not satisfy a threshold, a signal energy threshold adjustment may be determined, which is equal to the difference between a respective signal power difference for the candidate sensing beam pattern and the transmit beam pattern, and the threshold. For example, the signal energy threshold adjustment may be determined based on the following relationship:

$$Adj = \Delta - X \quad (1)$$

where $\Delta$ is the signal power difference and X is the threshold. In the event that a candidate sensing beam fails to satisfy the threshold criteria for each of a plurality of transmission beam directions, the wireless communication device may be configured to determine a signal energy threshold adjustment for each of the transmission beam directions, and select the signal energy threshold adjustment that is the largest in absolute value. In other words, in the signal energy threshold adjustment for a candidate sensing beam that fails to meet a threshold criteria for two or more transmission beam directions (i) may be determined based on the following relationship:

$$Adj = \min_i (\Delta_i - X) \quad (2)$$

Although aspects of the schemes 800a, 800b, 900a, 900b, 1000 are described as being performed by a manufacturing/calibration device, including performing beam coverage tests by comparing a signal power difference (or signal gain difference) to a threshold, it will be understood that some of these aspects may be performed by a network wireless communication device, such as a BS or a UE. For example, the manufacturing/calibration device may be configured to generate the beam coverage information to include signal power and/or signal gain measurements for each of a plurality of sensing beam patterns with respect to each of a plurality of transmit beam patterns. The network wireless communication device may then be configured to perform the beam coverage test during operation based on the signal power and/or signal gain measurements (or other beam coverage parameters) prior to performing channel sensing, such as an LBT. For example, the network wireless communication device may be configured to determine the signal power difference values and/or compare the signal power difference values to the threshold. In other aspects, the manufacturing/calibration device determines the signal power difference values (and/or signal gain difference values), and the network wireless communication device compares the signal power difference values to the threshold to validate a given candidate sensing beam pattern.

Figure 11:
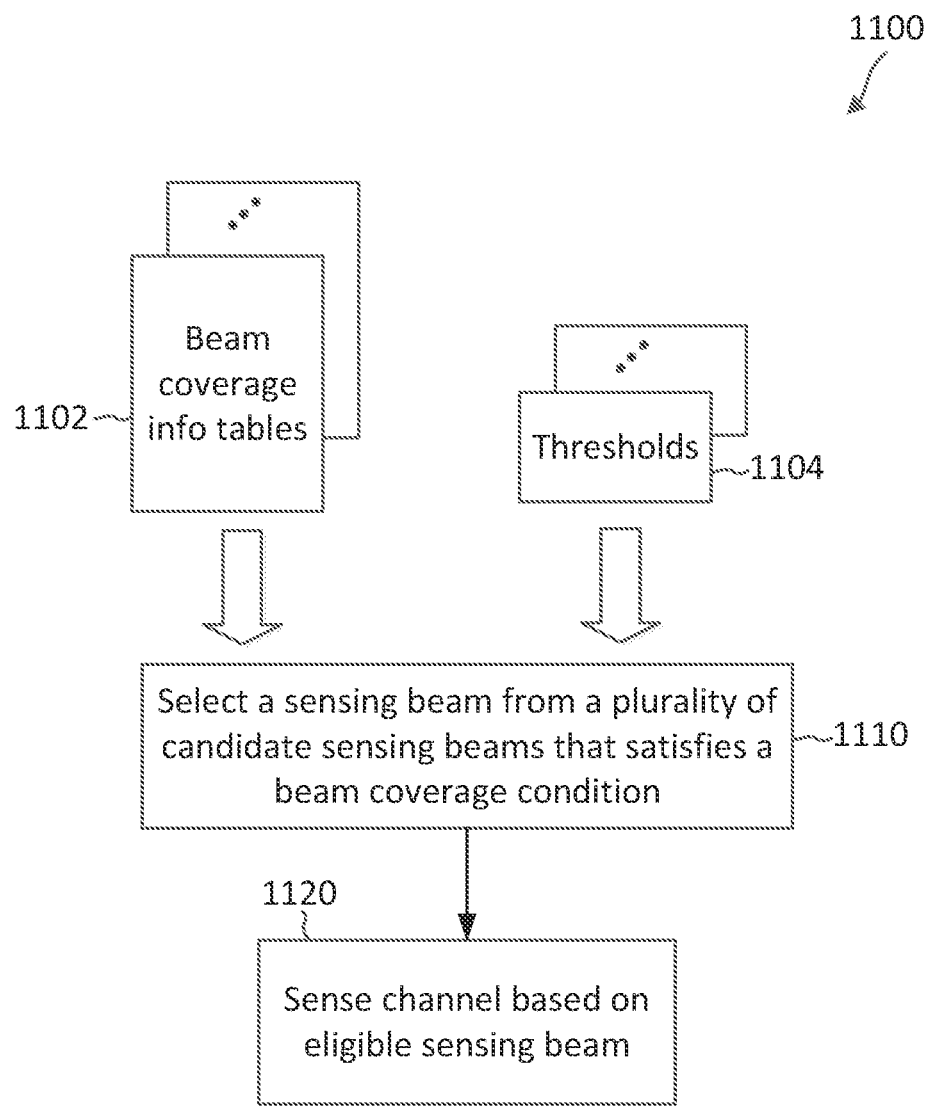
FIG. 11 illustrates a channel access method according to some aspects of the present disclosure.

FIG. 11 illustrates a channel access method 1100 according to some aspects of the present disclosure. The method 1100 may be employed by BSs such as the BSs 105 and/or 205 and/or UEs such as the UEs 115 and/or 215. In particular, a wireless communication device (e. g., a BS or a UE) may determine which channel access procedure (s) to use for channel access in an unlicensed band, for example, in the mmWave range or sub-THz range, using the method 1100. In some aspects, the wireless communication device may be a BS similar to the BS 105, 205, and/or 1200 and may utilize one or more components, such as the processor 1202, the memory 1204, the beam coverage module 1208, the transceiver 1210, the modem 1212, and the one or more antennas 1216 with reference to FIG. 12, to execute the actions of the method 1100. In other aspects, the wireless communication device may be similar to a UE such as the UEs 115, 215, and/or 1300, and may utilize one or more components, such as the processor 1302, the memory 1304, the beam coverage module 1308, the transceiver 1310, the modem 1312, and the one or more antennas 1316 with reference to FIG. 13, to execute the actions of the method 1100.

At a high level, in the method 1100, a wireless communication device may utilize similar metric (s) (e. g., signal power difference, signal gain difference, pointing angle difference, QCL relation, EDT, EDT adjustments) and threshold condition discussed above in the schemes 700-1000 to validate a candidate sensing beam pattern or direction for a channel sensing procedure during operation (e. g., in real-time).

At block 1110, a wireless communication device (e. g., a BS 105, 205, 1200, a UE 115, 215, or a wireless communication device 1300) selects a sensing beam from a plurality of candidate sensing beams that satisfies a beam coverage condition. The beam coverage condition may be related to the difference in signal power and/or signal between a candidate sensing beam associated with a first beam direction, and a desired transmit beam associated with a second beam direction. In particular, the wireless communication device may determine whether the beam coverage condition is satisfied based on beam coverage information 1102, and one or more thresholds 1104. As described above, the beam coverage information may include signal power or signal gain measurements, signal power difference measurements, such as a difference in EIRP, signal energy thresholds, signal energy threshold adjustments, beam coverage test results, or any other suitable beam coverage parameter and/or combinations thereof. The beam coverage information may be organized into lists, tables, link lists, or any suitable data structures such that a particular portion of the beam coverage information (e. g., a signal power difference) is associated with a candidate sensing beam direction and a desired transmit beam direction. In particular, the beam coverage information may include a sensing configuration indicating, for each of a plurality of candidate sensing beam directions, the beam coverage information with respect to one or more transmit beam directions.

In some aspects, block 1110 may include selecting a sensing beam from a plurality of candidate sensing beams that satisfies a beam coverage condition. For example, the wireless communication device may determine whether a given candidate sensing beam direction is valid or eligible to perform channel sensing before communicating in a given transmit beam direction. In some aspects, the wireless communication device selects the sensing beam based on beam coverage information (e.g., list, table) determined or generated by a manufacturing or calibration device (e.g., test equipment). For example, the beam coverage information may be stored in a memory of the wireless communication device, and may indicate whether a sensing beam is eligible or valid for one or more transmit beam direction. In other aspects, the wireless communication device may be configured to compare a signal power difference or a signal gain difference to a threshold, where the signal power difference or signal gain difference is associated with the candidate sensing beam direction and the transmit beam direction. In some aspects, the comparison of the beam coverage information, such as the signal power difference, may be constrained by one or more other beam coverage parameters, such an angular difference between the candidate sensing beam direction and the transmit beam direction. For example, a given candidate sensing beam may only be considered eligible if it satisfies a respective threshold and is within a range of angular differences. This additional criteria may improve the selection of a candidate sensing beam direction to avoid poorly-matched candidate sensing beams for channel sensing before transmitting in a desired transmit beam direction. In another aspect the comparison of the beam coverage information may be constrained by a QCL relation.

In some aspects, block 1110 includes determining an adjustment to a signal energy threshold (e.g., EDT) based on the beam coverage information. For example, the wireless communication device may be configured, based on a signal power difference, to determine and apply a first adjustment to EDT to compensate for the power difference between the sensing beam and the transmission beam. In a further aspect, the wireless communication device may be configured to determine and apply a second adjustment to EDT based on a difference between a signal power difference and a corresponding threshold. For example, the wireless communication device may be configured to determine the second adjustment to EDT based on equations (1) and/or (2). The wireless communication device may be configured to apply either or both of the first and second EDT adjustments to compensate for the signal power difference. In other aspects, the adjustments to EDT may be based on beam gain differences, instead of or in addition to signal power differences.

At block 1120, if the candidate sensing beam direction is determined valid at block 1110, the wireless communication device performs channel sensing using the sensing beam direction. If the channel sensing (LBT) results in a pass, wireless communication device may proceed to communicate in the one or more desired transmit beam directions. In some aspects, block 1110 includes determining a signal energy threshold adjustment based on the comparison of the beam coverage information to the threshold. For example, to better match the sensitivity of transmissions in the desired transmit beam direction, the wireless communication device may determine and/or apply an adjustment to an EDT. Accordingly, the wireless communication device may determine whether the channel is available in the one or more desired transmit beam directions based on the adjusted signal energy threshold. In some aspects, the signal energy threshold adjustment may be determined based on the signal power difference. In other aspects, the signal energy threshold adjustment made be determined based on a difference between the signal power difference and the threshold. In some aspects, if a given candidate sensing beam does not meet the threshold criteria, the wireless communication device is configured to apply at least a first signal energy threshold adjustment, where the first signal energy threshold adjustment is associated with the difference between the signal power difference in threshold, as described above. In other aspects, the wireless communication device may be configured to apply both the first signal energy threshold adjustment and a second signal energy threshold adjustment, where the second signal energy threshold adjustment is associated with the signal power difference.

Figure 12:
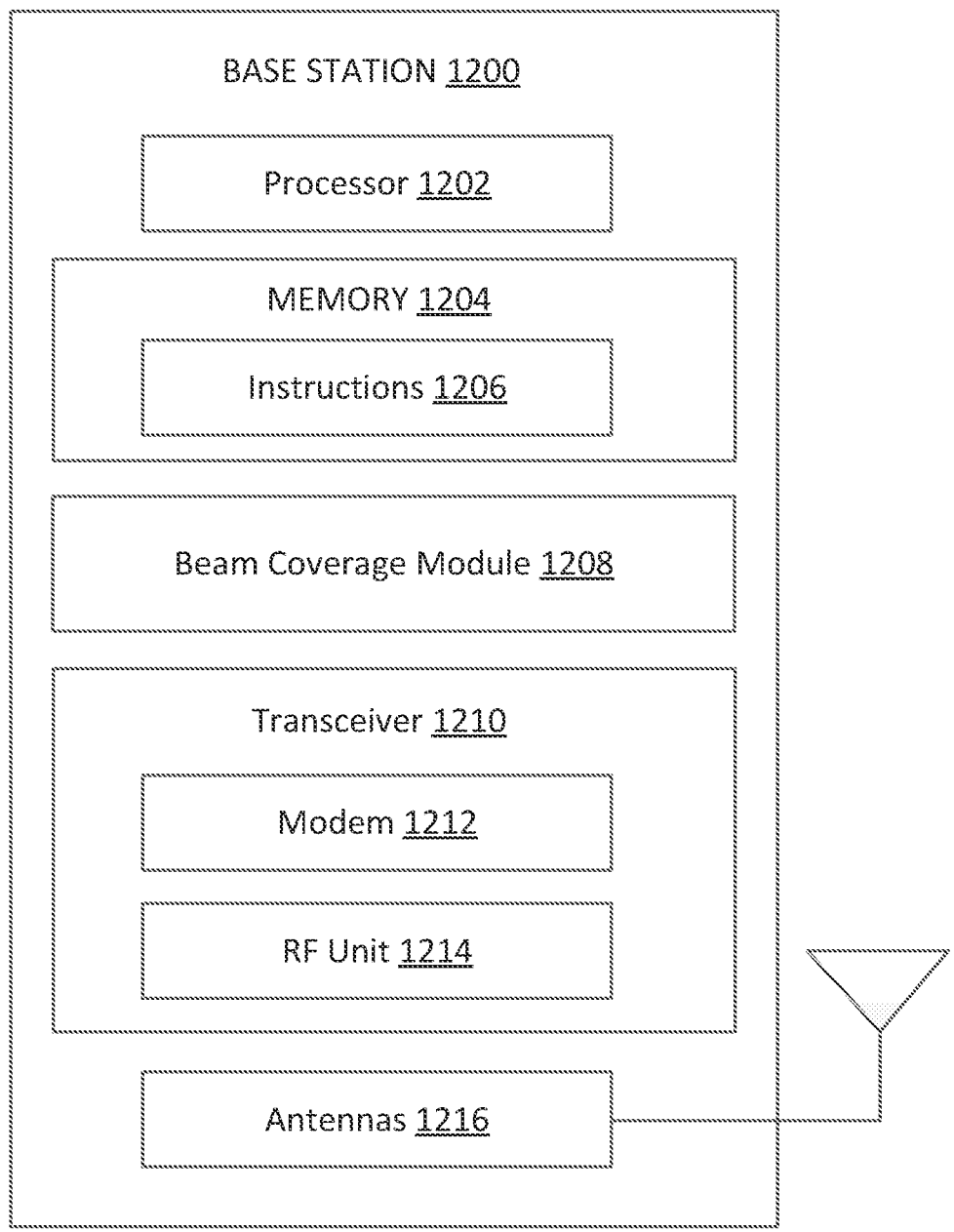
FIG. 12 illustrates a block diagram of a base station (BS) according to some aspects of the present disclosure.

FIG. 12 is a block diagram of an exemplary wireless communication device 1200 according to some aspects of the present disclosure. In some aspects, the wireless communication device 1200 may be a manufacturing/calibration device, which may also be referred to as a testing device, discussed with respect to FIGS. 4-10. As shown, the wireless communication device 1200 may include a processor 1202, a memory 1204, a beam coverage module 1208, a transceiver 1210 including a modem subsystem 1212 and a RF unit 1214, and one or more antennas 1216. These elements may be coupled with one another. The term "coupled" may refer to directly or indirectly coupled or connected to one or more intervening elements. For instance, these elements may be in direct or indirect communication with each other, for example via one or more buses.

The processor 1202 may have various features as a specific-type processor. For example, these may include a CPU, a DSP, an ASIC, a controller, a FPGA device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1204 may include a non-transitory computer-readable medium. The memory 1204 may store instructions 1206. The instructions 1206 may include instructions that, when executed by the processor 1202, cause the processor 1202 to perform operations described herein, for example, aspects of FIGS. 4-10. Instructions 1206 may also be referred to as program code. The program code may be for causing a wireless communication device to perform these operations, for example by causing one or more processors (such as processor 1202) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The beam coverage module 1208 may be implemented via hardware, software, or combinations thereof. For example, the beam coverage module 1208 may be implemented as a processor, circuit, and/or instructions 1206 stored in the memory 1204 and executed by the processor 1202. In some examples, the beam coverage module 1208 can be integrated within the modem subsystem 1212. For example, the beam coverage module 1208 can be implemented by a combination of software components (e.g., executed by a DSP or a general processor) and hardware components (e.g., logic gates and circuitry) within the modem subsystem 1212. The beam coverage module 1208 may communicate with one or more components of the wireless communication device 1200 to implement various aspects of the present disclosure, for example, aspects of FIGS. 4-10.

In some aspects, the beam coverage module 1208 is configured to: receive, from a second wireless communication device, one or more signals for each of a plurality of candidate sensing beams and a transmission beam; determine, for each of the plurality of candidate sensing beams based on at least one of the one or more signals in the respective candidate sensing beam, a first signal measurement with respect to at least one of a direction of the transmission beam direction or a direction of the respective candidate sensing beam; determine, based on at least one of the one or more signals for the transmission beam, a second signal measurement with respect to the transmission beam direction; and determine, for each of the plurality of candidate sensing beams based on the respective first signal measurement and the second signal measurement, beam coverage information with respect to the transmission beam direction.

In some aspects, the beam coverage module 1208 is configured to determine the first signal measurement with respect to the respective candidate sensing beam direction. In some aspects, the beam coverage module 1208 is configured to determine, based on the first respective signal measurement, a third signal measurement with respect to the transmission beam direction, where the determining the beam coverage information is based on the third signal measurement. In some aspects, the beam coverage module 1208 is configured to determine, for at least a first candidate sensing beam direction of the plurality of candidate sensing beam directions, a signal power difference between the respective first signal measurement and the second signal measurement. In some aspects, the beam coverage module 1208 is configured to determine an EIRP difference between the respective first signal measurement and the second signal measurement.

In some aspects, the beam coverage module 1208 is configured to determine, for at least a first candidate sensing beam direction of the plurality of candidate sensing beam directions, a beam gain difference between the respective first signal measurement and the second signal. In some aspects, the beam coverage module 1208 is configured to determine, for at least a first candidate sensing beam of the plurality of candidate sensing beam directions, a spatial angular difference between the respective candidate sensing beam direction with respect to the transmission beam direction.

In some aspects, the beam coverage module 1208 is configured to determine, for at least a first candidate sensing beam of the plurality of candidate sensing beam directions, a quasi co-location (QCL) relationship between the respective candidate sensing beam direction with respect to the transmission beam direction. In some aspects, the beam coverage module 1208 is configured to determine whether the first candidate sensing beam direction satisfies a beam coverage condition based on a comparison of: at least one of a signal power difference, a beam gain difference, a spatial angular difference, or an EDT adjustment based on the respective first signal measurement and the second signal measurement with a corresponding threshold. In some aspects, the beam coverage module 1208 is configured to determine whether the at least one of the signal power difference, the beam gain difference, the spatial angular difference, or the EDT adjustment is greater than a non-positive threshold. In some aspects, the beam coverage module 1208 is configured to determine whether the at least one of the signal power difference, the beam gain difference, the spatial angular difference, or the EDT adjustment is less than a positive threshold. In some aspects, the beam coverage module 1208 is configured to receive an indication of the transmission beam. In some aspects, the beam coverage module 1208 is configured to select, based on the indication, a sensing beam. In some aspects, the indication of the transmission beam indicates at least one of a sounding reference signal resource indicator (SRI) associated with the transmission beam, or a transmission configuration indicator (TCI) associated with the transmission beam. For example, in some aspects, the beam coverage module 1208 may determine the sensing beam based on a QCL TypeD relationship between the transmission beam indication and the sensing beam.

In some aspects, the beam coverage module 1208 is configured to determine, for at least the first candidate sensing beam of the plurality of candidate sensing beam directions, a second signal energy threshold adjustment based on at least one of: a signal power difference and a signal power difference threshold; or a beam gain difference and a beam gain difference threshold. In some aspects, the beam coverage module 1208 is configured to determine, for at least the first candidate sensing beam of the plurality of candidate sensing beam directions, a second signal energy threshold adjustment based on at least one of a signal power difference or a beam gain difference, where the second signal energy threshold adjustment is associated with a difference between the corresponding threshold and the difference in signal power.

In some aspects, the beam coverage module 1208 is configured to generate a sensing configuration including: an indication of each of the plurality of candidate sensing beam directions; and an association between each of the plurality of candidate sensing beam directions and at least one of a signal power difference, a beam gain difference, a QCL relationship, a spatial angular difference, a result of a beam coverage condition, or an EDT adjustment based on the respective first signal measurement and the second signal measurement.

As shown, the transceiver 1210 may include the modem subsystem 1212 and the RF unit 1214. The transceiver 1210 can be configured to communicate bi-directionally with other devices, such as the UEs 115 and/or wireless communication device 1300 and/or another core network element. The modem subsystem 1212 may be configured to modulate and/or encode data according to a MCS, e.g., a LDPC coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., narrow transmission beams, interference test beams, interference test results, RRC configurations, MIB, SIB, PDSCH data and/or PDCCH DCIs, etc.) from the modem subsystem 1212 (on outbound transmissions) or of transmissions originating from another source such as a UE 115, 215, and/or wireless communication device 1300. The RF unit 1214 may be further configured to perform analog beamforming in conjunction with the digital beamforming. Although shown as integrated together in transceiver 1210, the modem subsystem 1212 and/or the RF unit 1214 may be separate devices that are coupled together at the wireless communication device 1200 to enable the wireless communication device 1200 to communicate with other devices.

The RF unit 1214 may provide the modulated and/or processed data, e.g. data packets (or, more generally, data messages that may contain one or more data packets and other information), to the antennas 1216 for transmission to one or more other devices. The antennas 1216 may further receive data messages transmitted from other devices and provide the received data messages for processing and/or demodulation at the transceiver 1210. The transceiver 1210 may provide the demodulated and decoded data (e.g., narrow transmission beams, interference test beams, interference test results, PUSCH data, PUCCH UCI, MSG1, MSG3, etc.) to the beam coverage module 1208 for processing. The antennas 1216 may include multiple antennas of similar or different designs in order to sustain multiple transmission links.

In an aspect, the WIRELESS COMMUNICATION DEVICE 1200 can include multiple transceivers 1210 implementing different RATs (e.g., NR and LTE). In an aspect, the WIRELESS COMMUNICATION DEVICE 1200 can include a single transceiver 1210 implementing multiple RATs (e.g., NR and LTE). In an aspect, the transceiver 1210 can include various components, where different combinations of components can implement different RATs.

Figure 13:
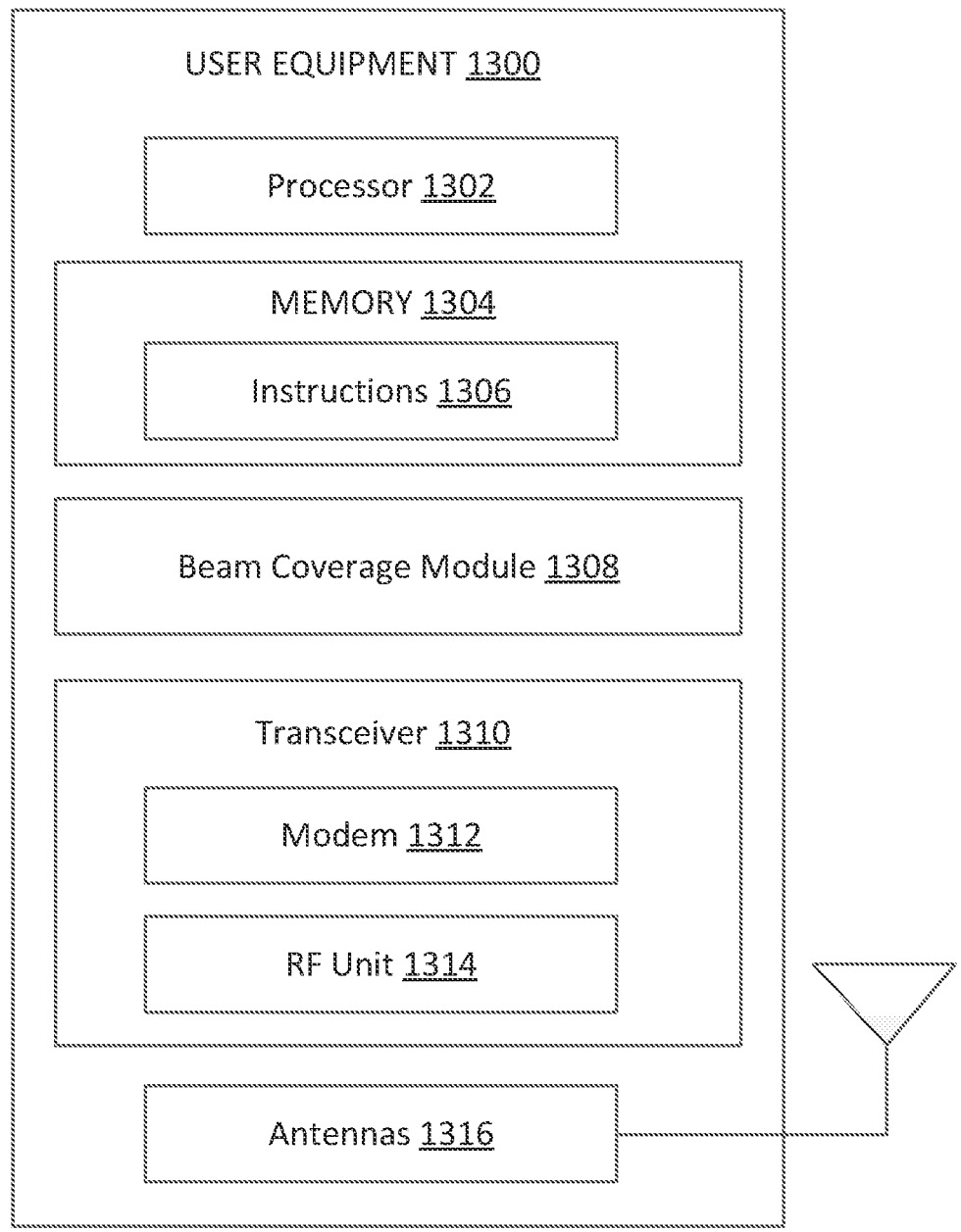
FIG. 13 illustrates a block diagram of a user equipment (UE) according to some aspects of the present disclosure.

FIG. 13 is a block diagram of an exemplary wireless communication device 1300 according to some aspects of the present disclosure. In some aspects, the wireless communication device 1300 may be configured to communicate in a network, such as the network 100. In some aspects, the wireless communication device 1300 may be a BS or a UE, such as one of the BSs 105 or the UEs 115 in the network 100. As shown, the wireless communication device 1300 may include a processor 1302, a memory 1304, a beam coverage module 1308, a transceiver 1310 including a modem subsystem 1312 and a radio frequency (RF) unit 1314, and one or more antennas 1316. These elements may be coupled with one another. The term "coupled" may refer to directly or indirectly coupled or connected to one or more intervening elements. For instance, these elements may be in direct or indirect communication with each other, for example via one or more buses.

The processor 1302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1304 includes a non-transitory computer-readable medium. The memory 1304 may store, or have recorded thereon, instructions 1306. The instructions 1306 may include instructions that, when executed by the processor 1302, cause the processor 1302 to perform the operations described herein with reference to a UE 115 or an anchor in connection with aspects of the present disclosure, for example, aspects of FIGS. 3-11 and 14-17. Instructions 1306 may also be referred to as code, which may be interpreted broadly to include any type of computer-readable statement(s) as discussed above with respect to FIG. 14.

The beam coverage module 1308 may be implemented via hardware, software, or combinations thereof. For example, the beam coverage module 1308 may be implemented as a processor, circuit, and/or instructions 1306 stored in the memory 1304 and executed by the processor 1302. In some aspects, the beam coverage module 1308 can be integrated within the modem subsystem 1312. For example, the beam coverage module 1308 can be implemented by a combination of software components (e.g., executed by a DSP or a general processor) and hardware components (e.g., logic gates and circuitry) within the modem subsystem 1312. The beam coverage module 1308 may communicate with one or more components of wireless communication device 1300 to implement various aspects of the present disclosure, for example, aspects of FIGS. 3-11.

In some aspects, the beam coverage module 1308 is configured to select, based on beam coverage information associated with a plurality of candidate sensing beam directions and one or more first transmission beam directions, a sensing beam direction from the plurality of candidate sensing beam directions. The beam coverage module 1308 is further configured to sense, based on the selected sensing beam direction, a channel in a shared frequency band, and determine, based on the sensing, whether to transmit a communication signal in the one or more first transmission beam directions.

In some aspects, the beam coverage information indicates, for each of the plurality of candidate sensing beam directions, at least one of: a signal power difference associated with the respective candidate sensing beam direction and the one or more first transmission beam directions; a beam gain difference associated with the respective candidate sensing beam direction and the one or more first transmission beam directions; a QCL relationship associated with the respective candidate sensing beam direction and the one or transmission beam directions; a spatial angular difference associated with the respective candidate sensing beam direction and the one or more first transmission beam directions; or an energy detection threshold (EDT) adjustment.

In some aspects, the beam coverage information indicates a respective EDT adjustment for the selected sensing beam direction, and wherein the sensing is further based on a reference energy detection threshold adjusted by the respective EDT adjustment. In some aspects, the beam coverage information indicates a respective signal power difference for the selected sensing beam direction, and wherein the sensing is further based on a reference energy detection threshold adjusted by a value, the value being based on the respective signal power difference and a comparison threshold. In some aspects, the beam coverage information indicates a respective beam gain difference for the selected sensing beam direction, and wherein the sensing is further based on a reference energy detection threshold adjusted by a value, the value being based on the respective beam gain difference and a comparison threshold. In some aspects, the beam coverage information indicates a respective spatial angular difference for the selected sensing beam direction, and wherein the sensing is further based on a reference energy detection threshold adjusted by a value, the value being based on the respective spatial angular difference and a comparison threshold.

In another aspect, the beam coverage module 1308 may be further configured to: determine a failure to select a sensing beam direction from the plurality of sensing beam directions that satisfies a sensing condition for a plurality of second transmission beam directions; and partition the plurality of second transmission beam directions into subsets, wherein one or more first transmission beams correspond to one of the subsets, where the selecting the sensing beam direction for the one or more first transmission beam directions is in response to the failure. In another aspects, the beam coverage module 1308 is configured to obtain, from the memory 1304 of the wireless communication device 1300, the beam coverage information.

As shown, the transceiver 1310 may include the modem subsystem 1312 and the RF unit 1314. The transceiver 1310 can be configured to communicate bi-directionally with other devices, such as the BSs 105 and 1420. The modem subsystem 1312 may be configured to modulate and/or encode the data from the memory 1304 and/or the beam coverage module 1308 according to a modulation and coding scheme (MCS), e.g., a low-density parity check (LDPC) coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., narrow beam transmissions, beam measurement signals, PUSCH data, PUCCH UCI, MSG1, MSG3, etc.) or of transmissions originating from another source such as a UE 115, a BS 105, or an anchor. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the wireless communication device 1300 to enable the wireless communication device 1300 to communicate with other devices.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices. The antennas 1316 may provide the received data messages for processing and/or demodulation at the transceiver 1310. The transceiver 1310 may provide the demodulated and decoded data (e.g., channel access procedure configurations, interference test results, RRC configurations, MIB, SIB, PDSCH data and/or PDCCH DCIs, etc.) to the beam coverage module 1308 for processing. The antennas 1316 may include multiple antennas of similar or different designs in order to sustain multiple transmission links.

In an aspect, the wireless communication device 1300 can include multiple transceivers 1310 implementing different RATs (e.g., NR and LTE). In an aspect, the wireless communication device 1300 can include a single transceiver 1310 implementing multiple RATs (e.g., NR and LTE). In an aspect, the transceiver 1310 can include various components, where different combinations of components can implement different RATs.

Figure 14:
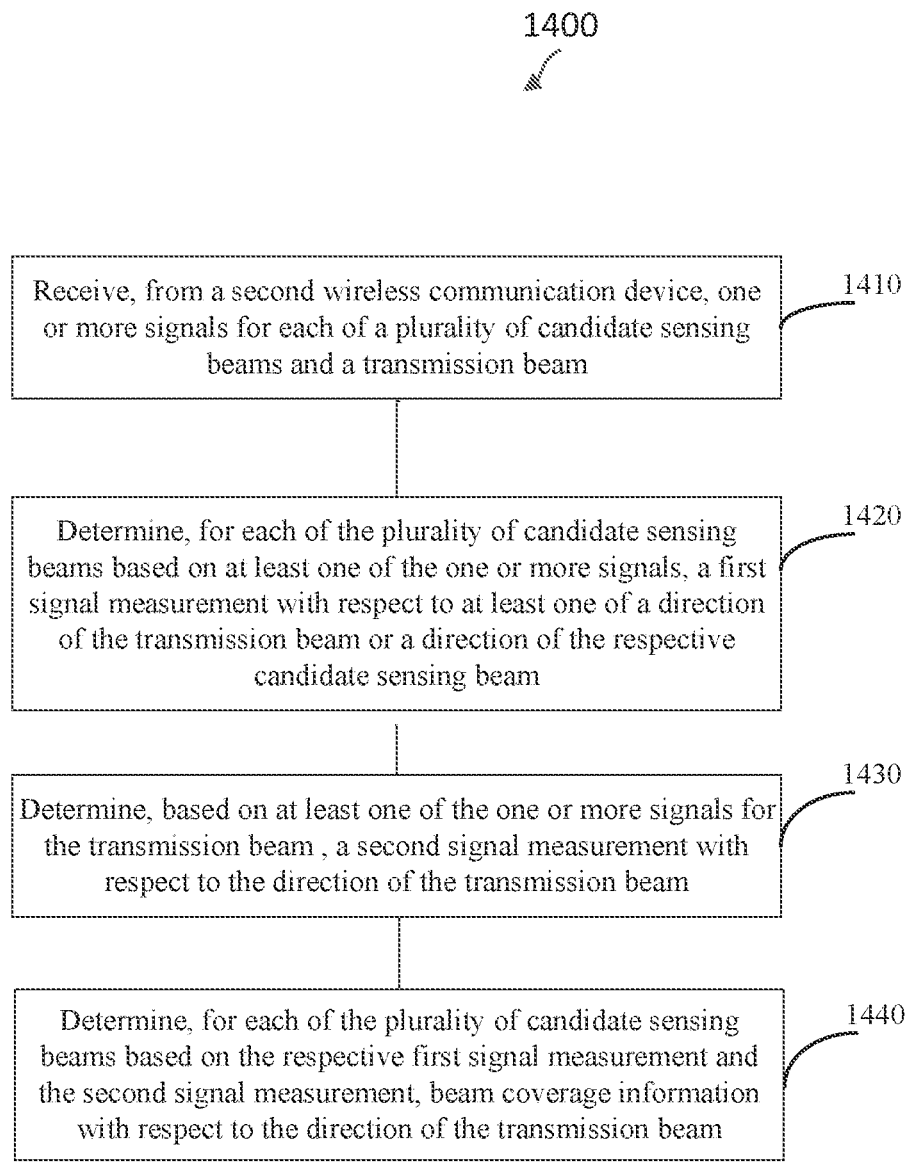
FIG. 14 is a flow diagram of a wireless communication method according to some aspects of the present disclosure.

FIG. 14 is a flow diagram illustrating a wireless communication method 1400 according to some aspects of the present disclosure. Aspects of the method 1400 can be executed by a computing device (e.g., a processor, processing circuit, and/or other suitable component) of a wireless communication device or other suitable means for performing the blocks. For example, a manufacturing/calibration device described above may perform one or more of the actions of the method 1400. In one aspect, a wireless communication device, such as the wireless communication device 1200, may utilize one or more components, such as the processor 1202, the memory 1204, the beam coverage module 1208, the transceiver 1210, the modem 1212, the RF unit 1214, and the one or more antennas 1216, to execute the blocks of method 1400. In some aspects, the one or more antennas 1216 may include an array of antenna elements positioned at different locations and configured to obtain spherical coverage information of a second wireless communication device, such as a UE and/or a BS. The method 1400 may employ similar mechanisms as described in FIGS. 3-11. As illustrated, the method 1400 includes a number of enumerated blocks, but aspects of the method 1400 may include additional blocks before, after, and in between the enumerated blocks. In some aspects, one or more of the enumerated blocks may be omitted or performed in a different order.

At block 1410, a first wireless communication device receives, from a second wireless communication device, one or more signals for each of a plurality of candidate sensing beam directions and a transmission beam direction. In some aspects, receiving the one or more signals may include receiving the one or more signals from a device under test (DUT) using a spherical beam coverage test setup, similar to the measurement setups 400, 500 described in FIGS. 4-5B above. In this regard, the first wireless communication device may include an array of antenna elements configured to receive the one or more signals from the DUT, and use beamforming techniques to receive and process the signals with respect to one or more beam directions. In some aspects, means for performing the functionality of block 1410 can, but not necessarily, include, for example, beam coverage module 1208, transceiver 1210, antennas 1216, processor 1202, and/or memory 1204 with reference to FIG. 12.

At block 1420, the first wireless communication device determines, for each of the plurality of candidate sensing beams based on at least one of the one or more signals for the respective candidate sensing beam, a first signal measurement with respect to at least one of a transmission beam direction or the respective candidate sensing beam direction. For example, the first wireless communication device may obtain signal power measurements and/or signal beam measurements as described above. In some aspects, block 1420 includes the first wireless communication device obtaining EIRP measurements of the one or more signals with respect to one or more beam directions using beamforming techniques. For example, at least some of the one or more beam directions may be associated with beam directions that are different from the direction of transmission of the DUT. In some aspects, means for performing the functionality of block 1420 can, but not necessarily, include, for example, beam coverage module 1208, transceiver 1210, antennas 1216, processor 1202, and/or memory 1204 with reference to FIG. 12.

At block 1430, the first wireless communication device determines, based on at least one of the one or more signals in the transmission beam direction, a second signal measurement with respect to the transmission beam direction. In this regard, block 1420 may include using beamforming to determine the second signal measurement with respect to the transmission beam direction of the DUT. As above, the second signal measurement may include a signal power measurement (e.g., EIRP) and/or a beam gain measurement. In some aspects, means for performing the functionality of block 1430 can, but not necessarily, include, for example, beam coverage module 1208, transceiver 1210, antennas 1216, processor 1202, and/or memory 1204 with reference to FIG. 12.

At block 1440, the first wireless communication device determines, for each of the plurality of candidate sensing beams based on the respective first signal measurement and the second signal measurement, beam coverage information for the transmission beam. Block 1440 may include, for example, comparing the first and second signal measurements described above to determine a difference between the signal measurements. For example, the second signal measurement may indicate a maximum signal power in the transmission beam direction, and the first signal measurement may indicate a signal power measurement determined using a sensing beam direction that is different from the transmission beam direction. Accordingly, block 1440 may include comparing the signal power of the DUT's transmission beam, which was received using the sensing beam, to the maximum signal power in the transmission beam direction. In some aspects, the method 1400 includes receiving an indication of the transmission beam. In some aspects, the method 1400 further includes selecting, based on the indication, a sensing beam. In some aspects, the indication of the transmission beam indicates at least one of a sounding reference signal resource indicator (SRI) associated with the transmission beam, or a transmission configuration indicator (TCI) associated with the transmission beam. For example, in some aspects, the method 1400 may include determining the sensing beam based on a QCL TypeD relationship between the transmission beam indication and the sensing beam. In some aspects, means for performing the functionality of block 1440 can, but not necessarily, include, for example, beam coverage module 1208, transceiver 1210, antennas 1216, processor 1202, and/or memory 1204 with reference to FIG. 12.

Figure 15:
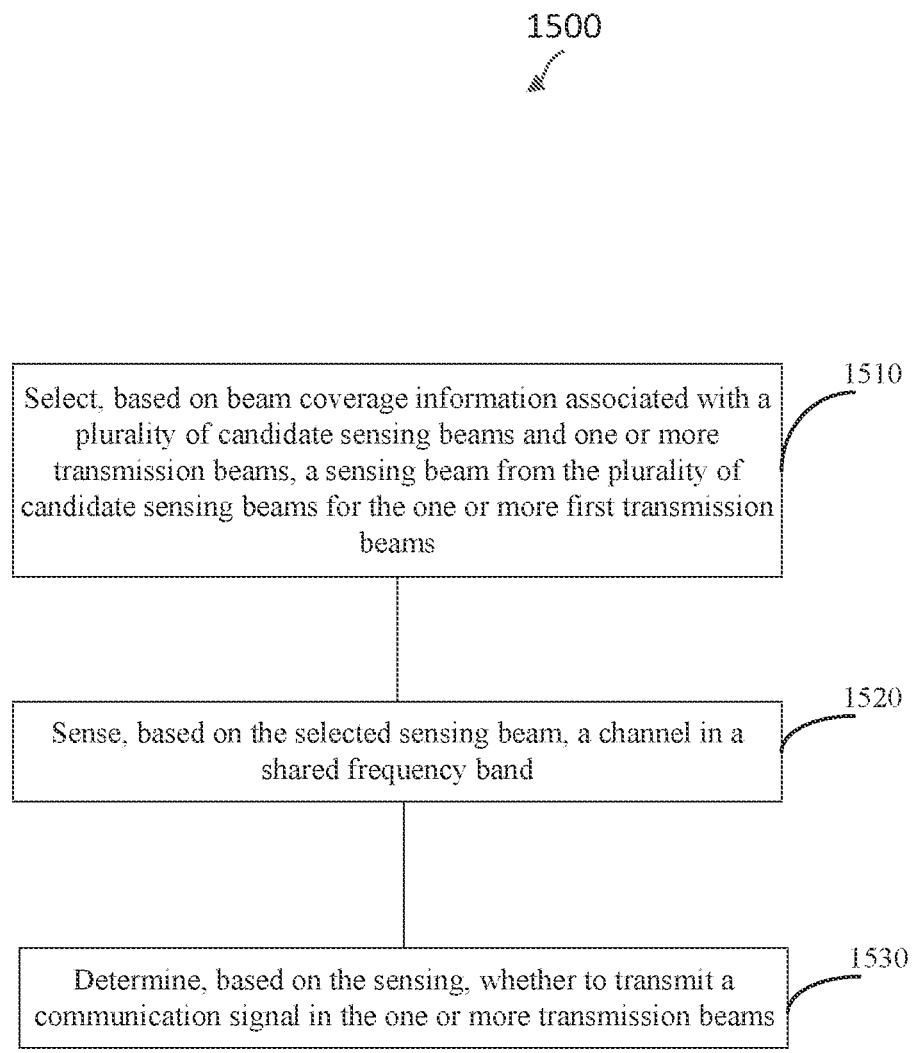
FIG. 15 is a flow diagram of a wireless communication method according to some aspects of the present disclosure.

FIG. 15 is a flow diagram illustrating a wireless communication method 1500 according to some aspects of the present disclosure. Aspects of the method 1500 can be executed by a computing device (e.g., a processor, processing circuit, and/or other suitable component) of a wireless communication device or other suitable means for performing the blocks. In one aspect, a wireless communication device, such as a UE 115, a BS 105, or a wireless communication device 1300, may utilize one or more components, such as the processor 1302, the memory 1304, the beam coverage module 1308, the transceiver 1310, the modem 1312, the RF unit 1314, and the one or more antennas 1316, to execute the blocks of method 1500. The method 1500 may employ similar mechanisms as described in FIGS. 3-11. As illustrated, the method 1500 includes a number of enumerated blocks, but aspects of the method 1500 may include additional blocks before, after, and in between the enumerated blocks. In some aspects, one or more of the enumerated blocks may be omitted or performed in a different order.

At block 1510, a wireless communication device selects, based on beam coverage information associated with a plurality of candidate sensing beams and one or more transmission beams, a sensing beam from the plurality of candidate sensing beams. For example, the beam coverage information may indicate, for each candidate sensing beam, whether the beam is eligible for sensing a channel for one or more transmission beams. In this regard, the beam coverage information may indicate whether each sensing beam satisfies one or more conditions. In some aspects, means for performing the functionality of block 1510 can, but not necessarily, include, for example, beam coverage module 1308, transceiver 1310, antennas 1316, processor 1302, and/or memory 1304 with reference to FIG. 13.

At block 1520, the wireless communication device senses, based on the selected sensing beam, a channel in a shared frequency band. In this regard, block 1520 may include the wireless communication device using receive beamforming techniques to perform a directional LBT. In some aspects, block 1520 further includes applying a signal energy threshold adjustment based on the beam coverage information. In some aspects, means for performing the functionality of block 1520 can, but not necessarily, include, for example, beam coverage module 1308, transceiver 1310, antennas 1316, processor 1302, and/or memory 1304 with reference to FIG. 13.

At block 1530, the wireless communication device determines, based on the sensing, whether to transmit a communication signal in the one or more transmission beams. In some aspects, means for performing the functionality of block 1530 can, but not necessarily, include, for example, beam coverage module 1308, transceiver 1310, antennas 1316, processor 1302, and/or memory 1304 with reference to FIG. 13.

In some aspects, the method 1500 may further include transmitting, to a second wireless communication device, an indication of a transmission beam. In some aspects, the indication of the transmission beam may include an indication of a TCI and/or a SRI. In some aspects, the TCI may indicate a QCL relationship. In some aspects, the TCI may indicate a QCL typeD relationship.

Further aspects of the present disclosure include the following:

Aspect 1. A method for wireless communication performed by a first wireless communication device, the method comprising:

receiving, from a second wireless communication device, one or more signals for each of a plurality of candidate sensing beams and a transmission beam;

determining, for each of the plurality of candidate sensing beams based on at least one of the one or more signals, a first signal measurement with respect to at least one of a direction of the transmission beam or a direction of the respective candidate sensing beam;

determining, based on at least one of the one or more signals for the transmission beam, a second signal measurement with respect to the direction of the transmission beam; and determining, for each of the plurality of candidate sensing beams based on the respective first signal measurement and the second signal measurement, beam coverage information with respect to the direction of the transmission beam.

Aspect 2. The method of aspect 1, wherein the first signal measurement comprises a receive signal power of the at least one of the one or more signals for the respective candidate sensing beam, wherein the second signal measurement comprises a receive signal power of the at least one of the one or more signals for the transmission beam, and wherein the determining the beam coverage information comprises:

determining, for at least a first candidate sensing beam of the plurality of candidate sensing beams, a signal power difference between the respective first signal measurement and the second signal measurement.

Aspect 3. The method of aspect 2, wherein the receive signal power of the at least one of the one or more signals for the respective candidate sensing beam and the receive signal power of the at least one of the one or more signals for the transmission beam are effective isotropic radiated powers (EIRPs), and wherein the determining the signal power difference comprises determining an EIRP difference between the respective first signal measurement and the second signal measurement.

Aspect 4. The method of any of aspects 1-3, wherein the first signal measurement comprises a beam gain associated with the at least one of the one or more signals for the respective candidate sensing beam, wherein the second signal measurement comprises a beam gain associated with the at least one of the one or more signals for the transmission beam, and wherein the determining the beam coverage information comprises:

determining, for at least a first candidate sensing beam of the plurality of candidate sensing beams, a beam gain difference between the respective first signal measurement and the second signal measurement.

Aspect 5. The method of any of aspects 1-4, wherein the determining the beam coverage information comprises:
determining, for at least a first candidate sensing beam of the plurality of candidate sensing beams, a spatial angular difference between the respective direction of the candidate sensing beam with respect to the direction of the transmission beam.

Aspect 6. The method of any of aspects 1-5, wherein the determining the beam coverage information comprises:
determining, for at least a first candidate sensing beam of the plurality of candidate sensing beam directions, a quasi co-location (QCL) relationship between the respective candidate sensing beam direction with respect to the transmission beam direction.

Aspect 7. The method of aspect 6, further comprising:
receiving, from the second wireless communication device, an indication of the transmission beam; and
selecting, based on the indication, a sensing beam.

Aspect 8. The method of aspect 7, wherein the indication of the transmission beam indicates at least one of a sounding reference signal resource indicator (SRI) associated with the transmission beam, or a transmission configuration indicator (TCI) associated with the transmission beam.

Aspect 9. The method of any of aspects 6-8, wherein the determining the beam coverage information comprises determining whether the first candidate sensing beam direction satisfies a beam coverage condition based on a comparison of:
at least one of a signal power difference, a beam gain difference, a spatial angular difference, a QCL relationship, or an EDT adjustment based on the respective first signal measurement and the second signal measurement with the beam coverage condition.

Aspect 10. The method of aspect 9,
wherein the beam coverage condition includes a non-positive threshold, and wherein the determining whether the first candidate sensing beam satisfies the beam coverage condition comprises:
determining whether the at least one of the signal power difference, the beam gain difference, the spatial angular difference, or the EDT adjustment is greater than the non-positive threshold.

Aspect 11. The method of aspect 9,
wherein the beam coverage condition is a positive threshold, and wherein the determining whether the first candidate sensing beam direction satisfies the beam coverage condition comprises:
determining whether the at least one of the signal power difference, the beam gain difference, or the spatial angular difference, is less than the positive threshold.

Aspect 12. The method of aspect 9, wherein the determining the beam coverage information comprises:
determining, for at least the first candidate sensing beam of the plurality of candidate sensing beams, a second energy threshold adjustment based on at least one of:
a signal power difference and a signal power difference threshold; or
a beam gain difference and a beam gain difference threshold.

Aspect 13. The method of any of aspects 1-12, further comprising:
partitioning a plurality of transmission beams into subsets, wherein one or more first transmission beams correspond to one of the subsets,
wherein the beam coverage information indicates the subsets.

Aspect 14. The method of any of aspects 1-13, wherein the beam coverage information comprises:
an indication of each of the plurality of candidate sensing beam directions; and
an association between each of the plurality of candidate sensing beam directions and at least one of a signal power difference, a beam gain difference, a QCL relationship, a spatial angular difference, a result of a beam coverage condition, or an EDT adjustment based on the respective first signal measurement and the second signal measurement.

Aspect 15. A method of wireless communication performed by a wireless communication device, the method comprising:
selecting, based on beam coverage information associated with a plurality of candidate sensing beams and one or more first transmission beams, a sensing beam from the plurality of candidate sensing beams for the one or more first transmission beams;
sensing, based on the selected sensing beam, a channel in a shared frequency band; and
determining, based on the sensing, whether to transmit a communication signal in the one or more first transmission beams.

Aspect 16. The method of aspect 15, wherein the beam coverage information comprises:
an indication of each of the plurality of candidate sensing beams; and
an association between each of the plurality of candidate sensing beams and at least one of a signal power difference, a beam gain difference, a QCL relationship, a spatial angular difference, a result of a beam coverage condition, or an EDT adjustment based on the respective first signal measurement and a second signal measurement.

Aspect 17. The method of aspect 16, wherein the beam coverage information indicates at least a subset of one or more of the plurality of candidate sensing beams passing a beam coverage condition associated with the one or more first transmission beam directions, and
wherein the selecting comprises selecting the sensing beam from the subset of the one or more of the plurality of candidate sensing beams.

Aspect 18. The method of any of aspects 15-17, wherein the beam coverage information indicates, for each of the plurality of candidate sensing beams, at least one of:
a signal power difference associated with the respective candidate sensing beam and the one or more first transmission beams;
a beam gain difference associated with the respective candidate sensing beam and the one or more first transmission beams;
a QCL relationship associated with the respective candidate sensing beam and the one or transmission beams;
a spatial angular difference associated with the respective candidate sensing beam and the one or more first transmission beams;
a result of a beam coverage test; or
an energy detection threshold (EDT) adjustment.

Aspect 19. The method of aspect 18, wherein the beam coverage information indicates an EDT adjustment for the selected sensing beam, and wherein the sensing is further based on a reference energy detection threshold adjusted by the respective EDT adjustment.

Aspect 20. The method of aspect 19, wherein the beam coverage information indicates a signal power difference for the selected sensing beam, and wherein the sensing is further based on a reference energy detection threshold adjusted by a value, the value being based on the respective signal power difference and a comparison threshold.

Aspect 21. The method any of aspects 18-20, wherein the beam coverage information indicates a respective beam gain difference for the selected sensing beam direction, and wherein the sensing is further based on a reference energy detection threshold adjusted by a value, the value being based on the respective beam gain difference and a comparison threshold.

Aspect 22. The method of any of aspects 18-20, wherein the beam coverage information indicates a spatial angular difference for the selected sensing beam, and wherein the sensing is further based on a reference energy detection threshold adjusted by a value, the value being based on the respective spatial angular difference and a comparison threshold.

Aspect 23. The method of any of aspects 15-22, further comprising:
obtaining, from a memory of the wireless communication device, the beam coverage information.

Aspect 24. The method of any of aspects 15-24, further comprising:
transmitting an indication of transmission beam, wherein the indication indicates at least one of a transmission configuration indicator (TCI) or a sounding reference signal resource indicator (SRI) associated with the transmission beam.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method for wireless communication performed by a first wireless communication device, the method comprising:
receiving, from a second wireless communication device, one or more signals for each of a plurality of candidate sensing beams and a transmission beam;
determining, for each of the plurality of candidate sensing beams based on at least one of the one or more signals, a first signal measurement with respect to at least one of a direction of the transmission beam or a direction of the respective candidate sensing beam;
determining, based on at least one of the one or more signals for the transmission beam, a second signal measurement with respect to the direction of the transmission beam; and
determining, for each of the plurality of candidate sensing beams based on the respective first signal measurement and the second signal measurement, beam coverage information with respect to the direction of the transmission beam, wherein the determining the beam coverage information comprises:
determining, for at least a first candidate sensing beam of the plurality of candidate sensing beam directions, a quasi co-location (QCL) relationship between the respective candidate sensing beam direction with respect to the transmission beam direction.

2. The method of claim 1, wherein the first signal measurement comprises a receive signal power of the at least one of the one or more signals for the respective candidate sensing beam, wherein the second signal measurement comprises a receive signal power of the at least one of the one or more signals for the transmission beam, and wherein the determining the beam coverage information comprises:
determining, for at least a first candidate sensing beam of the plurality of candidate sensing beams, a signal power difference between the respective first signal measurement and the second signal measurement.

3. The method of claim 2, wherein the receive signal power of the at least one of the one or more signals for the respective candidate sensing beam and the receive signal power of the at least one of the one or more signals for the transmission beam are effective isotropic radiated powers (EIRPs), and wherein the determining the signal power difference comprises determining an EIRP difference between the respective first signal measurement and the second signal measurement.

4. The method of claim 1, wherein the first signal measurement comprises a beam gain associated with the at least one of the one or more signals for the respective candidate sensing beam, wherein the second signal measurement comprises a beam gain associated with the at least one of the one or more signals for the transmission beam, and wherein the determining the beam coverage information comprises:
determining, for at least a first candidate sensing beam of the plurality of candidate sensing beams, a beam gain difference between the respective first signal measurement and the second signal measurement.

5. The method of claim 1, wherein the determining the beam coverage information comprises:
determining, for at least a first candidate sensing beam of the plurality of candidate sensing beams, a spatial angular difference between the respective direction of the candidate sensing beam with respect to the direction of the transmission beam.

6. The method of claim 1, further comprising:
receiving, from the second wireless communication device, an indication of the transmission beam; and
selecting, based on the indication, a sensing beam.

7. The method of claim 6, wherein the indication of the transmission beam indicates at least one of a sounding reference signal resource indicator (SRI) associated with the transmission beam, or a transmission configuration indicator (TCI) associated with the transmission beam.

8. The method of claim 1, wherein the determining the beam coverage information comprises determining whether the first candidate sensing beam direction satisfies a beam coverage condition based on a comparison of:
at least one of a signal power difference, a beam gain difference, a spatial angular difference, a QCL relationship, or an energy detection threshold (EDTA adjustment based on the respective first signal measurement and the second signal measurement with the beam coverage condition.

9. The method of claim 8,
wherein the beam coverage condition includes a non-positive threshold, and wherein the determining whether the first candidate sensing beam satisfies the beam coverage condition comprises:
determining whether the at least one of the signal power difference, the beam gain difference, the spatial angular difference, or the EDT adjustment is greater than the non-positive threshold.

10. The method of claim 8,
wherein the beam coverage condition is a positive threshold, and wherein the determining whether the first candidate sensing beam direction satisfies the beam coverage condition comprises:
determining whether the at least one of the signal power difference, the beam gain difference, or the spatial angular difference, is less than the positive threshold.

11. The method of claim 8, wherein the determining the beam coverage information comprises:
determining, for at least the first candidate sensing beam of the plurality of candidate sensing beams, a second energy threshold adjustment based on at least one of:
a signal power difference and a signal power difference threshold; or
a beam gain difference and a beam gain difference threshold.

12. The method of claim 1, further comprising:
partitioning a plurality of transmission beams into subsets, wherein one or more first transmission beams correspond to one of the subsets,
wherein the beam coverage information indicates the subsets.

13. The method of claim 1, wherein the beam coverage information comprises:
an indication of each of the plurality of candidate sensing beam directions; and
an association between each of the plurality of candidate sensing beam directions and at least one of a signal power difference, a beam gain difference, a quasi co-location (QCL) relationship, a spatial angular difference, a result of a beam coverage condition, or an energy detection threshold (EDTA) adjustment based on the respective first signal measurement and the second signal measurement.

14. A first wireless communication device, comprising:
at least one processor; and
at least one transceiver in communication with the at least one processor, wherein the first wireless communication device is configured to:
receive, from a second wireless communication device, one or more signals for each of a plurality of candidate sensing beams and a transmission beam;
determine, for each of the plurality of candidate sensing beams based on at least one of the one or more signals, a first signal measurement with respect to at least one of a direction of the transmission beam or a direction of the respective candidate sensing beam;
determine, based on at least one of the one or more signals for the transmission beam, a second signal measurement with respect to the direction of the transmission beam; and
determine, for each of the plurality of candidate sensing beams based on the respective first signal measurement and the second signal measurement, beam coverage information with respect to the direction of the transmission beam, wherein the first wireless communication device configured to determine the beam coverage information comprises:
the first wireless communication device configured to determine, for at least a first candidate sensing beam of the plurality of candidate sensing beam directions, a quasi co-location (QCL) relationship between the respective candidate sensing beam direction with respect to the transmission beam direction.

* * * * *